United States Patent
Shiraki et al.

[11] Patent Number: 5,892,979
[45] Date of Patent: Apr. 6, 1999

[54] QUEUE CONTROL APPARATUS INCLUDING MEMORY TO SAVE DATA RECEIVED WHEN CAPACITY OF QUEUE IS LESS THAN A PREDETERMINED THRESHOLD

[75] Inventors: Osamu Shiraki; Yoichi Koyanagi; Takeshi Horie; Toshiyuki Shimizu; Hiroaki Ishihata, all of Kawasaki, Japan

[73] Assignee: Fujitsu Limited, Kawasaki, Japan

[21] Appl. No.: 967,219

[22] Filed: Oct. 29, 1997

Related U.S. Application Data

[63] Continuation of Ser. No. 503,940, Jul. 19, 1995, abandoned.

[30] Foreign Application Priority Data

Jul. 20, 1994 [JP] Japan ................................. 6-168482

[51] Int. Cl.⁶ .................................................. G06F 13/00
[52] U.S. Cl. ........................... 395/872; 395/876; 395/877
[58] Field of Search ..................................... 395/675, 842, 395/849, 890; 370/237, 474

[56] References Cited

U.S. PATENT DOCUMENTS

| | | | |
|---|---|---|---|
| 4,563,762 | 1/1986 | Sibley ........................................ | 371/16 |
| 4,603,382 | 7/1986 | Cole et al. ............................... | 364/200 |
| 4,920,534 | 4/1990 | Adelmann et al. ...................... | 370/474 |
| 4,964,119 | 10/1990 | Endo et al. ............................... | 370/237 |
| 5,088,091 | 2/1992 | Schroeder et al. ...................... | 370/94.3 |
| 5,138,615 | 8/1992 | Lamport et al. ........................ | 370/94.3 |
| 5,179,662 | 1/1993 | Corrigan et al. ........................ | 395/250 |
| 5,210,749 | 5/1993 | Firoozmand ............................ | 370/85.1 |
| 5,218,670 | 6/1993 | Sodek, Jr. et al. ...................... | 395/115 |
| 5,361,372 | 11/1994 | Rege et al. ............................... | 395/800 |
| 5,410,672 | 4/1995 | Sodek, Jr. et al. ...................... | 395/425 |
| 5,412,801 | 5/1995 | De Ramer et al. ...................... | 395/575 |
| 5,426,639 | 6/1995 | Follett et al. ............................ | 370/94.1 |
| 5,463,732 | 10/1995 | Taylor et al. ............................ | 395/163 |
| 5,485,584 | 1/1996 | Hausman et al. ....................... | 395/842 |
| 5,526,128 | 6/1996 | Fujiki et al. ............................. | 358/444 |
| 5,539,666 | 7/1996 | Kobayashi et al. ..................... | 395/890 |
| 5,640,599 | 6/1997 | Roskowski et al. .................... | 395/849 |
| 5,701,482 | 12/1997 | Harrison et al. ........................ | 395/675 |

FOREIGN PATENT DOCUMENTS 4-205345  7/1992  Japan ................................ G06F 3/12

*Primary Examiner*—Thomas C. Lee
*Assistant Examiner*—Anderson I. Chen
*Attorney, Agent, or Firm*—Staas & Halsey

[57] ABSTRACT

An overflow control unit stores, in a FIFO buffer, data generated by a processor. The overflow control unit sets a predetermined flag, upon detecting that a FIFO buffer is full or nearly full. The overflow control unit stores, in a saving buffer, data sent from the processor, while the flag is set. Thereafter, the overflow control unit notifies the processor, by an interrupt, of an effect that an available capacity of the FIFO buffer rises above a predetermined threshold.

Upon receiving an interrupt, the processor transfers to the FIFO buffer data saved in the saving buffer. Upon a completion of transferring to the FIFO buffer all data saved in the saving buffer, the processor resets the flag. This allows the overflow control unit to again store in the FIFO buffer, data sent from the processor. The overflow control unit also monitors the volume of data stored in the saving buffer, and notifies the processor, by an interrupt, of an effect that the saving buffer is full. Upon receiving an interrupt, the processor expands an available capacity of the saving buffer.

29 Claims, 20 Drawing Sheets

| END BIT | COMMAND TYPE |
|---|---|
| END BIT | PARAMETER 1 |
| END BIT | PARAMETER 2 |
| ... | ... |
| END BIT | PARAMETER n |

FIG. 14

| | | |
|---|---|---|
| 1 | COMMAND TYPE | |
| 2 | PARAMETER 1 | |
| 3 | PARAMETER 2 | |
| ... | ... | |
| n | PARAMETER m | |

FIG. 10

| | | | |
|---|---|---|---|
| 1 | END BIT | QUEUE NUMBER | COMMAND TYPE |
| 2 | END BIT | QUEUE NUMBER | PARAMETER 1 |
| 3 | END BIT | QUEUE NUMBER | PARAMETER 2 |
| ⋮ | ⋮ | ⋮ | ⋮ |
| n | END BIT | QUEUE NUMBER | PARAMETER n |

QUEUE CONTROL APPARATUS INCLUDING MEMORY TO SAVE DATA RECEIVED WHEN CAPACITY OF QUEUE IS LESS THAN A PREDETERMINED THRESHOLD

This application is a continuation of application Ser. No. 08/503,940, filed Jul. 19, 1995, now abandoned.

BACKGROUND OF THE INVENTION

1. Field of the Invention

This invention pertains to a queue control apparatus for use in exchanging data between a data generating side and a data using side.

2. Description of the Related Arts

A queue is used for absorbing a difference in a process timing between a data generating side (a data generating apparatus) and a data using side processing data (a data processing apparatus). The data may be a message, a packet, a job, a transaction and so forth. A queue is generally composed of, for example, a FIFO (First-In, First-Out) memory forming a FIFO buffer. A data generating device puts generated data into a queue, and a data processing device takes the data out of the queue for executing a predetermined process.

A queue has a storage capacity sufficient for storing a plurality of packets. This allows a data processing device to take out from a queue one data block at a time for a sequential data processing in accordance with its own processing capability. In addition, having a plurality of a data generating device share a single queue enables a single data processing device to receive a data processing request from the plurality of data generating devices. Further, always putting generated data immediately into a queue, as long as the queue has an available space, allows each of the plurality of data generating devices to start the next processing, promptly thus ensuring an efficient operation.

However, a conventional queue control apparatus has the following disadvantages:

1. Firstly, because a queue has a limit on its data capacity, when a queue becomes full, (i.e. when a queue does not have an available space), a side supplying a data block into the queue, (i.e. a data generating device), must stand by before supplying the next data set until the queue has an available space. The necessity for a data generating device to stand by idle for an available space in a queue lowers its processing efficiency.

2. Secondly, when a data processing device, (such as one processing a series of data columns as a packet), is connected to the output side of a queue, the queue cannot complete the processing of the packet until the data generating device supplies all data in a packet. That is, until a data generating device supplies all data in a packet to a queue, a data processing device must suspend its processing. Hence, in such a case, unless a packet is taken out of a queue after a data generating device has supplied all data in a packet, the packet processing device experiences an idle time, which lowers its processing efficiency.

3. Thirdly, a packet processing may occasionally require previously supplied data to be removed from a queue while a data generating device supplies packet data. However, when a data processing device has already started to process a packet by taking data already supplied to a queue, out from the queue, it is impossible to remove such already supplied data. Hence, in such a case, the data processing device has no choice but to discard the packet data. Such a situation occurs e.g. in a system where a data generating device comprises a processor for executing a plurality of programs (processes) and each of the processes individually generates a packet to be written into a shared queue. That is, the system experiences this situation when another process obtains an execution right, while a process writes packet data into the shared queue, and this newly scheduled process makes an attempt to write into the shared queue packet data it generates.

SUMMARY OF THE INVENTION

This invention aims to accelerate processing by facilitating data output without a data generating unit having to stand by until queue has available memory area, even when a queue is full.

This invention structures a queue control apparatus to comprise, a data storage device for sequentially storing data supplied from a data generating device and for sequentially outputting, on a FIFO (First-In, First-Out) basis, the data to a data processing device, a first detection unit for detecting that a remaining storage capacity of the data storage unit falls below a predetermined first threshold, a saved data memory unit for saving data outputted from the data generating device to the data storage unit after detection by the first detection unit, and a data saving control unit for saving, in the saved data memory unit, data to be outputted from the data generating device to the data storage deice, when the first detection unit detects that a remaining storage capacity of the data storage unit falls below the first threshold.

This invention realizes a queue control apparatus having a higher processing speed. Because a saved data memory unit stores data sent to a queue, after a first detection unit detects that the queue cannot receive any more data, a data generating device need not stand by for an available space in the queue. Furthermore, because a flag set after the above detection is not reset until all data saved in the saved data memory unit are transferred to the queue, the sequence of data sent to the queue is preserved without an error.

BRIEF DESCRIPTION OF THE DRAWINGS

Anyone with ordinary skill in the art can easily understand the additional features and objects of this invention from the description of the preferred embodiments and the attached drawings.

In the drawings:

FIG. 10 is a table, illustrating the format of a packet stored in FIFO buffer unit 1010 (comprising two [2] FIFO memories, FIFO MEMORY 1 and FIFO MEMORY 2) in queue control device 1000, shown in FIG. 8;

FIG. 14 is a table, illustrating the format of a packet stored in saving buffer 1020 in queue control device 2000, shown in FIG. 13;

DESCRIPTION OF THE PREFERRED EMBODIMENTS

Figure 1:
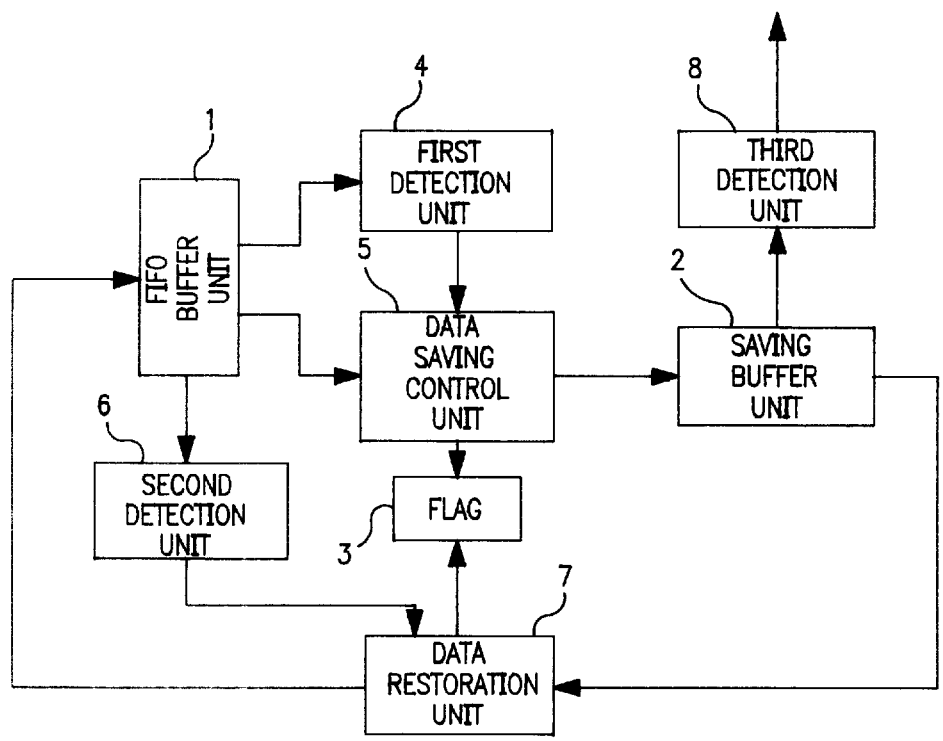
FIG. 1 is a block diagram, illustrating a basic principle underlying a queue control apparatus, pursuant to a first form of this invention.

FIG. 1 is a block diagram, illustrating a basic principle underlying a queue control apparatus, pursuant to a first form of this invention.

A queue control apparatus shown in FIG. 1 comprises a FIFO buffer 1, a saving buffer unit 2, and a flag 3. A data processing device (not shown) writes packet data into FIFO buffer unit 1. Saving buffer unit 2 saves packet data supposed to be written into FIFO buffer 1. A flag 3 indicates whether or not saving buffer unit 2 has saved packet data. The queue control apparatus may also comprise a first detection unit 4 and a data saving control unit 5.

The first detection unit 4 detects whether or not a remaining storage capacity of the FIFO buffer unit 1 falls below a predetermined first threshold.

When the first detection unit 4 detects that the remaining storage capacity of the FIFO buffer unit 1 is less than the first threshold, data saving control unit 5 saves, in the saving buffer unit 2, subsequent data to be written into FIFO buffer unit 1, and sets the flag 3; and continues to write into saving buffer unit 2 subsequent data supposed to be written into FIFO buffer 1, while the data saving control unit 5 has set the flag 3.

The queue control apparatus may also comprise a second detection unit 6, a data restoration unit 7 and a third detection unit 8.

Second detection unit 6 detects whether or not the remaining storage capacity of the FIFO buffer unit 1 is more than a predetermined second threshold, while data saving control unit 5 has set the flag 3.

When second detection unit 6 detects that a remaining storage capacity of the FIFO buffer unit 1 rises above a predetermined second threshold, while flag 3 is set, data restoration unit 7 starts transferring to FIFO buffer unit 1 data saved in saving buffer 2. Thereafter, second detection unit 6 resets flag 3, when saving buffer unit 2 saves no data.

Third detection unit 8 detects whether or not a remaining storage capacity of saving buffer unit 2 falls below a predetermined third threshold. When third detection unit 8 detects that the remaining storage capacity of saving buffer unit 2 falls below a predetermined third threshold, it outputs a specific signal, such as an interrupt signal, e.g. to an external processor.

The queue control apparatus, shown in FIG. 1, operates as follows:

When first detection unit 4 detects that the remaining storage capacity of the FIFO buffer unit 1 falls below the predetermined first threshold. When data restoration unit 7 issues a request for writing data into FIFO buffer unit 1 after first detection unit 4 detects such a status, data saving control unit 5 writes the data into saving buffer unit 2 and sets flag 3. Then, while flag 3 is set, data saving control unit 5 writes into saving buffer unit 2 data supposed to be written into FIFO buffer unit 1.

This invention enables a data generating apparatus that writes data into FIFO buffer unit 1 to output data without having to stand by for FIFO buffer unit 1 to have an empty space, (even if FIFO buffer unit 1 has no available space), which improves processing efficiency.

When second detection unit 6 detects that a remaining storage capacity of FIFO buffer unit 1 rises above a predetermined threshold, while data saving unit 5 has set the flag 3, data restoration unit 7 starts transferring to FIFO buffer unit 1 data saved in saving buffer unit 2. When saving buffer unit 2 has no saved data, it resets flag 3.

This ensures that data saved in saving buffer unit 2 are written into FIFO buffer unit 1 in a proper sequence and in a proper format. That is, data saved in saving buffer unit 2 are always written into FIFO buffer unit 1 in a proper sequence and in a proper format. Then, after flag 3 is reset, while FIFO MEMORY 1 has an available space, data are written normally into FIFO buffer 1.

Third detection unit 8 detects whether or not the remaining storage capacity of saving buffer unit 2 falls below a predetermined third threshold, and outputs a specific signal to an external unit.

This enables such a processor control to increase the size of saving buffer unit 2 e.g. by an interrupt e.g. to a processor.

Figure 2:
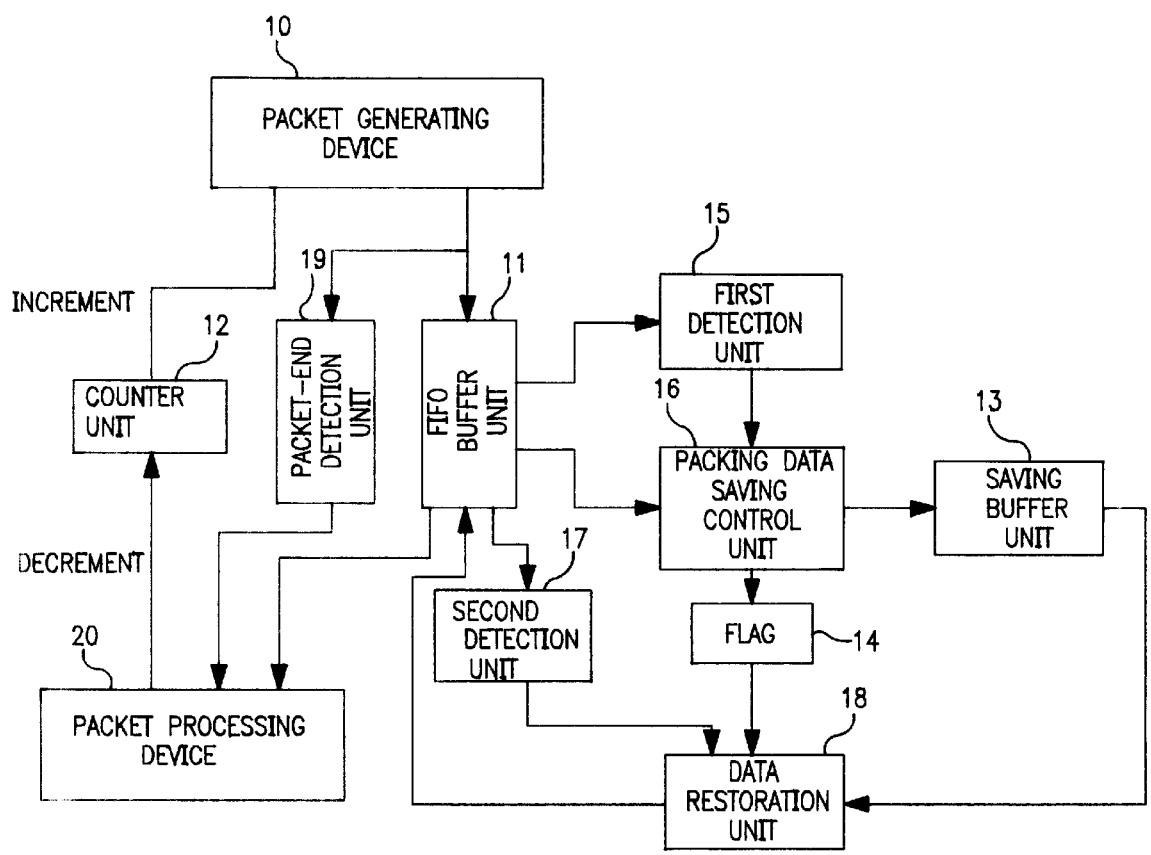
FIG. 2 is a block diagram, illustrating a basic principle underlying a queue control apparatus, pursuant to a second form of this invention.

FIG. 2 is a block diagram, illustrating a basic principle underlying a queue control apparatus, pursuant to a second form of this invention.

The queue control apparatus shown in FIG. 2 comprises a FIFO buffer unit 11 and a counter unit 12. FIFO buffer unit 11 stores a packet. A counter unit 12 counts the number of packets stored in FIFO buffer 11.

The queue control apparatus shown in FIG. 2 may further comprise a saving buffer 13, a flag 14, a first detection unit 15 and a packet data saving control unit 16. Saving buffer unit 13 saves packet data written in FIFO buffer unit 11. Flag 14 indicates whether or not saving buffer unit 13 saves packet data. First detection unit 15 detects whether or not a remaining storage capacity of FIFO buffer unit 11 falls below a predetermined first threshold. When first detection unit 15 detects that the remaining storage capacity of FIFO buffer unit 11 falls below the first threshold, packet data saving control unit 16 saves, in saving buffer unit 13, subsequent packet data supposed to be written into FIFO buffer unit 11, sets the flag 14, and keeps redirecting packet data to saving buffer unit 13 in lieu of FIFO buffer unit 11 while flag 14 is set.

An end bit may accompany each of the packet data sets stored in the FIFO buffer 11. An end bit indicates that its accompanying packet data set is the last data set in a packet.

The queue control apparatus shown in FIG. 2 may further comprise a second detection unit 17 and a data restoration unit 18. Second detection unit 17 detects whether or not the counter value of the counter unit 12 falls below a predetermined second threshold, while flag 14 is set. When second detection unit 17 detects that the number of packets stored in FIFO buffer unit 11 falls below the second threshold, data restoration unit 18 starts transferring to FIFO buffer unit 11 data saved in saving buffer unit 13, and resets flag 14 when saving buffer unit 13 stores no more data.

The queue control apparatus shown in FIG. 2 may further comprise a packet-end detection unit 19. Packet-end detection unit 19 detects whether or not FIFO buffer unit 11 has complete packet data, by referring to the counter value of the counter unit 12.

The queue control apparatus shown in FIG. 2 has counter unit 12 count the number of packet data sets stored in FIFO buffer 11. Hence, a reference to the counter number of counter unit 12 enables a determination to be made about whether or not FIFO buffer unit 11 stores a complete packet. This enables a packet processing device 20 to continually take out packet data sets after FIFO buffer unit 11 completes its packets, thereby improving packet processing efficiency.

FIG. 1 shows a case in which saving buffer unit 2, flag 3, first detection unit 4, and packet data saving control unit 5 write packet data into FIFO buffer unit 1. Similarly, FIG. 2 shows a case in which saving buffer unit 13, overflow flag 14, first detection unit 15 and packet data saving control unit 16 write packet data into FIFO buffer unit 11.

Hence, packet generating device 10 can continually output packet data without having to stand by for FIFO buffer unit 11 to have an available space, even after FIFO buffer unit 11 exhausts all available spaces, thereby improving packet processing efficiency.

While flag 14 is set, when second detection unit 17 detects that the counter value of counter unit 12, i.e. the number of packets stored in FIFO buffer unit 11, falls below a predetermined second threshold, data restoration unit 18 starts transferring to FIFO buffer unit 11 packet data saved in saving buffer unit 13, and resets flag 14 when saving buffer unit 13 no longer saves a packet data set.

Therefore, FIFO buffer unit 11 restores a packet saved in saving buffer unit 13, including a packet whose data are only partially saved, in a proper sequence and in a proper format. That is, even if saving buffer unit 13 saves a remaining part of the packet data after a part of packet data are written into FIFO buffer unit 11, FIFO buffer unit 11 restores the packet in a proper sequence and in a proper format.

A reference of a counter value of counter unit 12 enables packet-end detection unit 19 to detect whether or not FIFO buffer unit 11 has a complete packet data set. This detection prevents FIFO buffer unit 11 from outputting an incomplete packet data set.

A reference to the value of a particular bit outputted from FIFO buffer unit 11, together with packet data, enables a packet processing device to easily detect whether or not a packet data set read out from FIFO buffer unit 11 is the last data set of the packet.

Figure 3:
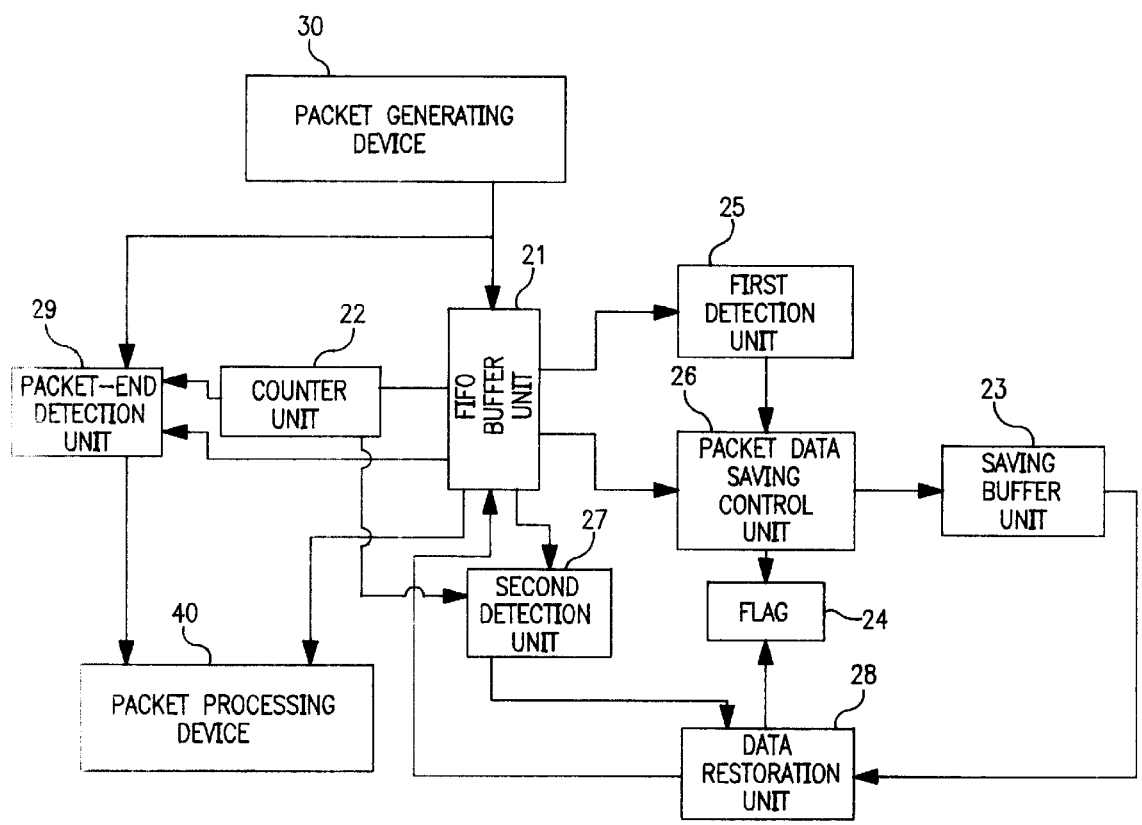
FIG. 3 is a block diagram, illustrating a basic principle underlying a queue control apparatus, pursuant to a third form of this invention.

FIG. 3 is a block diagram, illustrating a basic principle underlying a queue control apparatus, pursuant to a third form of this invention.

The queue control apparatus shown in FIG. 3 comprises a FIFO buffer 21, a counter unit 22 and a packet-end detection unit 29. FIFO buffer unit 21 stores packet data with a packet size data set. Counter unit 22 counts the number of data packets stored in FIFO buffer unit 21. Packet-end detection unit 29 detects whether or not FIFO buffer unit 21 has a complete packet by inputting a counter value of counter unit 22 and packet data, stored in the head end of FIFO buffer unit 21, together with the packet size data.

The queue control apparatus shown in FIG. 3 may further comprise a saving buffer unit 23, a flag 24, a first detection unit 25 and a packet data saving control unit 26. Saving buffer unit 23 saves packet data written into the FIFO buffer 21. Flag 24 indicates whether or not the saving buffer unit 23 has saved packet data. First detection unit 25 detects whether or not a remaining storage capacity of FIFO buffer unit 21 falls below a predetermined first threshold. When first detection unit 25 detects that a remaining storage capacity of the FIFO buffer unit 21 falls below the first threshold, packet data saving control unit 26 saves, in saving buffer unit 23, subsequent data to be written into FIFO buffer unit 21, sets flag 24, and keeps redirecting packet data to saving buffer unit 13 in lieu of FIFO buffer unit 11 while flag 14 is set.

The queue control apparatus shown in FIG. 3 may further comprise a second detection unit 27 and a data restoration unit 28. Second detection unit 27 detects whether or not the counter value of the counter unit 22 falls below a predetermined second threshold, while the flag 24 is set. When second detection unit 27 detects that the number of packets stored in FIFO buffer unit 21 falls below the second threshold, data restoration unit 28 starts transferring to FIFO buffer unit 11 data saved in saving buffer unit 13, and resets flag 24 when saving buffer unit 23 stores no more data.

The queue control apparatus shown in FIG. 3 has counter unit 22 count the number of packet data sets stored in FIFO buffer unit 21. Hence, a reference to the counter number of counter unit 22 compared with inputted data having size data of a packet stored at the head end of FIFO buffer 21, enables a determination to be made about whether or not FIFO buffer unit 21 stores a complete packet.

Accordingly, the use of detection data of packet-end detection unit 29 prevents FIFO buffer unit 11 from outputting an incomplete packet data set to packet processing device 40.

FIG. 2 shows a case in which saving buffer 13, flag 14, first detection unit 15 and packet data saving control unit 16 write packet data into FIFO buffer unit 11. Similarly, FIG. 3 shows a case in which saving buffer unit 23, flag 24, first detection unit 25, and packet data saving control unit 26 write packet data into FIFO buffer unit 21.

Hence, packet generating device 10 can continually output packet data without having to stand by for FIFO buffer unit 11 to have an available space, after FIFO buffer unit 11 exhausts all available spaces, thereby improving packet processing efficiency.

While flag 24 is set, when second detection unit 27 detects that the counter value of counter unit 22, i.e. the number of packets stored in FIFO buffer unit 21, falls below a predetermined second threshold, data restoration unit 28 starts transferring to FIFO buffer unit 21 packet data saved in saving buffer unit 23, and resets flag 24 when saving buffer unit 23 no longer saves a packet data set.

Therefore, FIFO buffer unit 21 restores a packet saved in saving buffer unit 23, including a packet whose data are only partially saved, in a proper sequence and in a proper format. That is, even if saving buffer unit 23 saves a remaining part of packet data after that part of packet data are written into FIFO buffer 11, FIFO buffer unit 11 restores the packet in a proper sequence and in a proper format.

Figure 4:
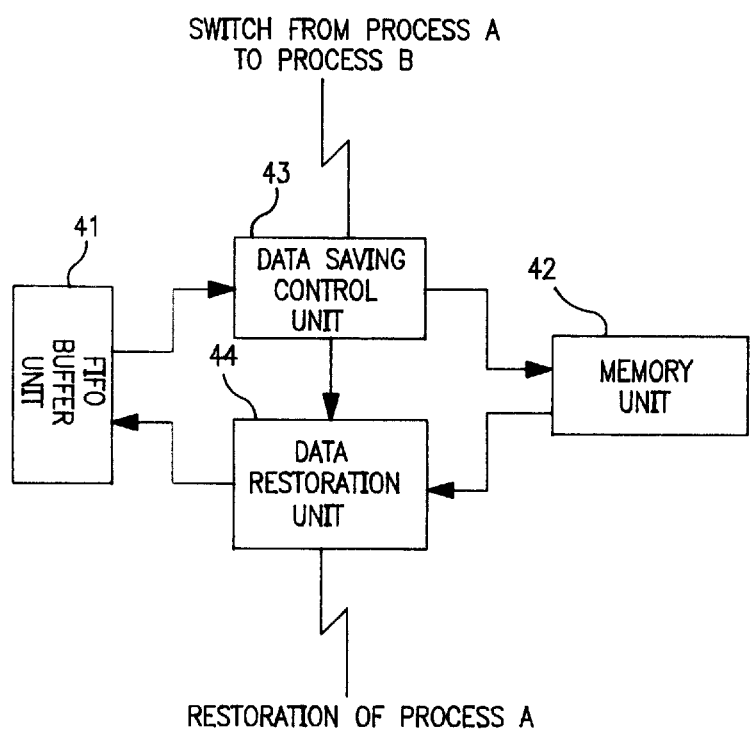
FIG. 4 is a block diagram, illustrating a basic principle underlying a queue control apparatus, pursuant to a fourth form of this invention.

FIG. 4 is a block diagram, illustrating a basic principle underlying a queue control apparatus, pursuant to a fourth form of this invention.

The queue control apparatus shown in FIG. 4 comprises a FIFO buffer unit 41, a memory unit 42, a data saving control unit 43 and a data restoration unit 44. A plurality of processes write packets into FIFO buffer unit 41. A data saving control unit 43 saves, in memory unit 42, incomplete packet data written during process A by removing them from FIFO buffer unit 41, upon switching of an execution right from process A to process B, while process A writes a packet into FIFO buffer unit 41. Data restoration unit 44 starts transferring to FIFO buffer unit 41 packet data saved in memory unit 42 before executing process A, upon switching of an execution right from process B back to process A, thereby restoring packet data.

The queue control apparatus shown in FIG. 4 has data saving control unit 43 save, in memory unit 42, incomplete packet data, written by process A, by removing them from FIFO buffer unit 41, upon switching of an execution right from process A to process B, while process A writes a packet into FIFO buffer unit 41. It also has data restoration unit 44 start transferring to FIFO buffer unit 41 packet data saved in memory unit 42 before executing process A, upon switching of an execution right from process B back to process A, thereby restoring packet data.

As such, even if packet data are written into FIFO buffer unit 41 during process A, packet data can be written into FIFO buffer unit 41 during process B, which is newly invoked. Then, upon reinvoking process A, after the restoration of packet data, remaining packet data are written into FIFO buffer unit 41 during process A, thereby enabling a packet to be written into FIFO buffer unit 41 in a proper sequence and in a proper format.

Figure 5:
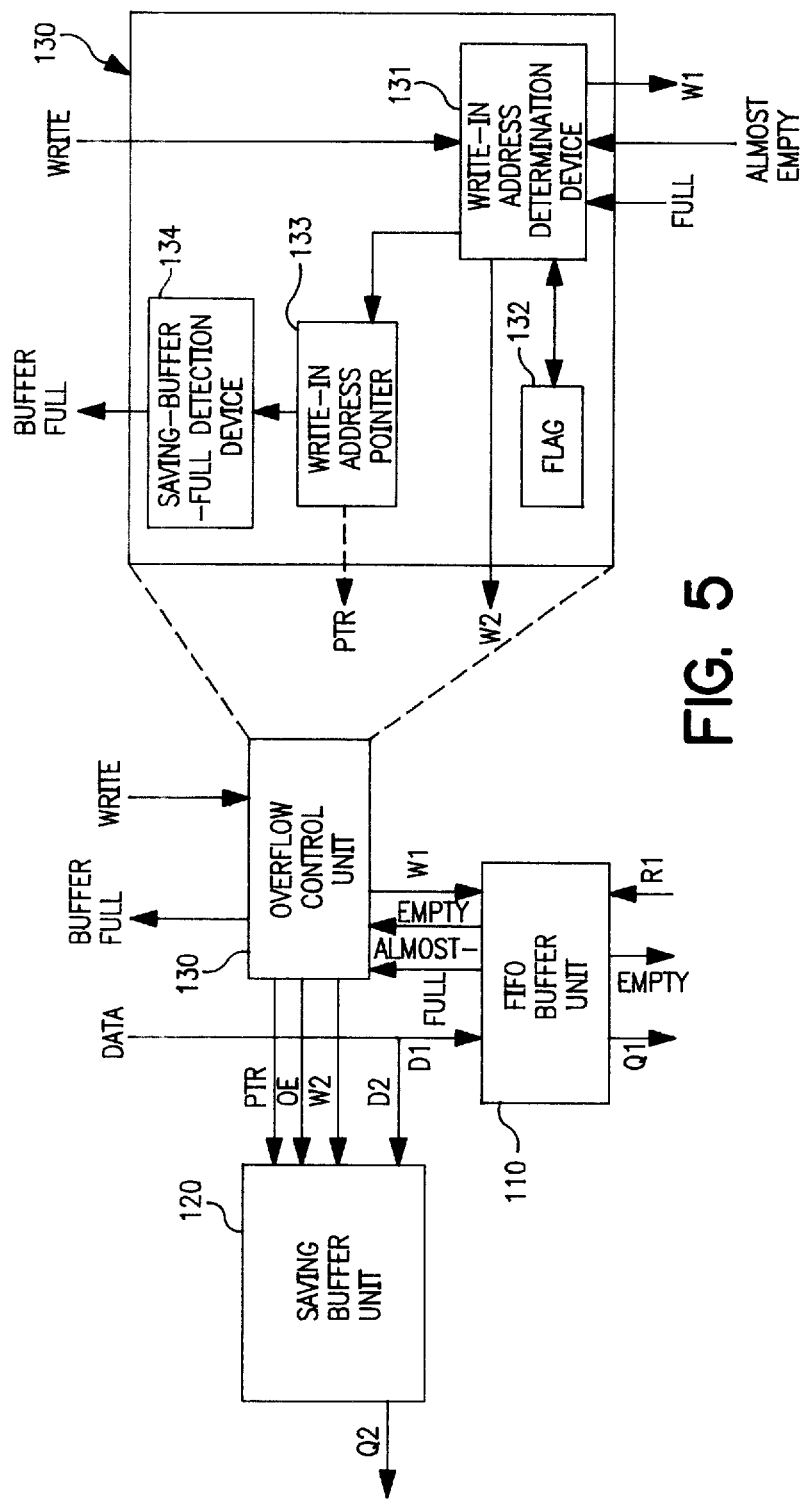
FIG. 5 is a block diagram, illustrating the global configuration of a queue apparatus device embodying this invention.

FIG. 5 is a block diagram, illustrating the global configuration of a queue control apparatus embodying this invention.

A FIFO buffer 110, e.g. comprising a single chip, is a FIFO (First-In, First-Out) memory capable of transferring (inputting and outputting) n-bit data in a batch. FIFO buffer unit 110 comprises an output terminal for a full flag signal "full" (hereafter referred to as a Full signal) indicating that a remaining capacity of FIFO buffer unit 110 falls below a predetermined first threshold, an output terminal for an empty flag signal "empty" (hereafter referred to as an Empty signal) indicating that FIFO buffer unit 110 currently stores no data at all; an input terminal for a write-enable signal W1 for enabling data to be written into FIFO buffer unit 110; and an input terminal for a read-enable signal R1 for enabling data to be read from FIFO buffer unit 110.

FIFO buffer unit 110 further comprises an n-bit data input line D1 and an n-bit data output line Q1. In addition, FIFO buffer unit 110 outputs an Almost-Empty signal when a remaining capacity of FIFO buffer unit 110 rises above a predetermined second threshold.

FIFO buffer unit 110 is composed e.g. of a SRAM (Static Random Access Memory) array. Data are inputted to or outputted from the SRAM array. In addition, FIFO buffer unit 110 comprises an input address pointer for specifying a write-in address for writing the next input data into the SRAM, and an output address pointer for specifying a readout address for reading the next output data from the SRAM. These two [2] pointers may be formed by ring counters, for example. FIFO buffer unit 110 further comprises a comparator for constantly monitoring and comparing the difference between address values specified by the two [2] pointers, and has the comparator generate and output the Full signal, the Empty signal and the Almost-Empty signal.

It is also possible to structure FIFO buffer unit 110 by a shift register instead of by an SRAM.

A saving buffer 120, e.g. comprising a DRAM (Dynamic Random Access Memory), has a storage capacity e.g. larger than that of FIFO buffer unit 110. Saving buffer unit 120 also comprises a data input line D2 of an n-bit width and a data output line Q2 of an n-bit width, as well as an input terminal for write-enable signal W2, which has a function equivalent to write-enable signal W1 for FIFO buffer unit 110 and an input terminal for output-enable signal OE for reading data out. When a remaining capacity of FIFO buffer unit 110 falls below the first threshold, i.e. when FIFO buffer unit 110 outputs a Full signal, saving buffer unit 120 saves and stores via data input line D2 data supposed to be written into FIFO buffer 110, under control of an overflow control unit 130.

Overflow control unit 130 receives a request for storing data in FIFO buffer unit 110 by an enable input of a data write-in request signal Write, according to the status of the Full signal inputted from FIFO buffer unit 110, and stores storage-requested data either in FIFO buffer unit 110 or in saving buffer unit 120.

Overflow control unit 130 comprises a write-in address determination device 131, an overflow flag 132, a write-in address pointer 133, and a saving buffer full detection device 134.

Upon receiving a data write-in request signal Write at "enable", write-in address determination device 131 determines whether or not the Full signal inputted from FIFO buffer unit 110 is active, and, if it is not active, writes data DATA inputted from an external device, together with the data write-in request signal Write, via data input line D1 into FIFO buffer unit 110 by controlling write-enable signal W1.

If a processor (not shown) supplies more data to FIFO buffer unit 110 than a packet processing device (not shown) removes data from the same, FIFO buffer unit 110 eventually becomes full, and FIFO buffer unit 110 sets the Full signal to "active". Upon receiving the data write-in request signal Write at "enable", while the Full signal is at "active", write-in address determination device 131 sets in write-in address pointer 133 a storage address, on saving buffer 120, of subsequent data supposed to be written into FIFO buffer unit 110, which are received after the data write-in request signal Write is set to "enable".

The address value set in write-in address pointer 133 is sent for an input to saving buffer unit 120 as an address signal Ptr. Then, after write-in address determination device 131 sets write-enable signal W2 to "enable", write-in request data DATA for FIFO buffer unit 110 are written via data input line D2 into an address, on saving buffer unit 120, specified by a pointer value set in write-in address pointer 133. Saving buffer unit 120 temporarily stores write-in request data DATA in this manner. Write-in address determination device 131 sets flag 132 after thus writing data into saving buffer unit 120.

Once flag 132 is set, write-in address determination device 131 executes a write-in control of transferring to saving buffer unit 120 subsequent write-in data DATA from an external device, to FIFO buffer unit 110. In the meantime, write-in address determination device 131 also monitors the Almost-Empty signal outputted from FIFO buffer unit 110. When the Almost-Empty signal becomes "active", i.e. when an available space of FIFO buffer unit 110 rises above the second threshold, write-in address determination device 131 transfers and restores data saved in saving buffer unit 120 via a data restoration device (not shown) to FIFO buffer 110 unit. On the other hand, there is a case in which a remaining capacity of saving buffer unit 120 falls below a predetermined third threshold, before the Almost-Empty signal becomes "active". Saving buffer full detection device 134 detects that saving buffer unit 120 is in such a status by a pointer value inputted form write-in address pointer 133, i.e. the storage address of subsequent data in saving buffer unit 120. Upon detecting it, saving buffer full detection device 134 outputs a buffer-full detection signal, "Buffer-Full", to the outside. The Buffer-Full signal is used e.g. as an interrupt signal for a data generating device such as a processor.

Figure 6:
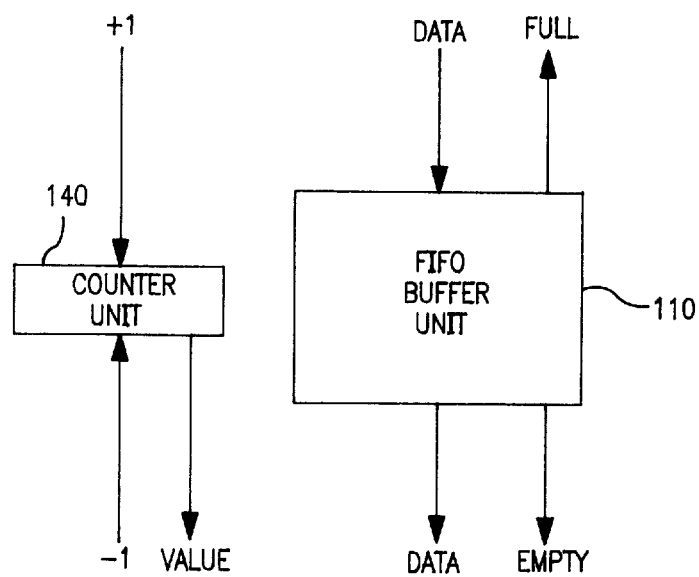
FIG. 6 is a sketch, schematically illustrating the concept of an embodiment in which FIFO buffer unit 110 (shown in FIG. 5) is used as a queue for storing a packet comprising one [1] or more data columns expressing e.g. a command.

FIG. 6 is a sketch, schematically illustrating the concept of an embodiment in which FIFO buffer unit 110 (shown in FIG. 5) is used as a queue for storing a packet comprising one [1] or more data columns expressing e.g. a command.

A counter unit 140 counts the number of packets stored in FIFO buffer unit 110, and outputs the counter value to a packet processing device for processing the packets by removing them from FIFO buffer unit 110.

A packet generating device, such as a processor, for supplying packets to FIFO buffer unit 110 has counter unit 140 increment its counter value by one [1] (i.e. +1). A packet processing device, such as a processor, for removing packets from FIFO buffer unit 110 has counter unit 140 decrement its counter value by one [1] (i.e. −1). That is, counter unit 140 increments its counter value by one [1] when data input side completes supplying a packet to FIFO buffer unit 110, and counter unit 140 decrements its counter value by one [1] when data output side completes removing a packet from FIFO buffer unit 110. A reference to a counter value of counter unit 140 thus obtained enables the number of packets stored in FIFO buffer unit 110 to be detected.

A provision of counter unit 140 for counting the number of packets enables a packet processing device to continually remove the packet data, for efficiently processing packets after FIFO buffer unit 110 has a complete packet.

Figure 7:
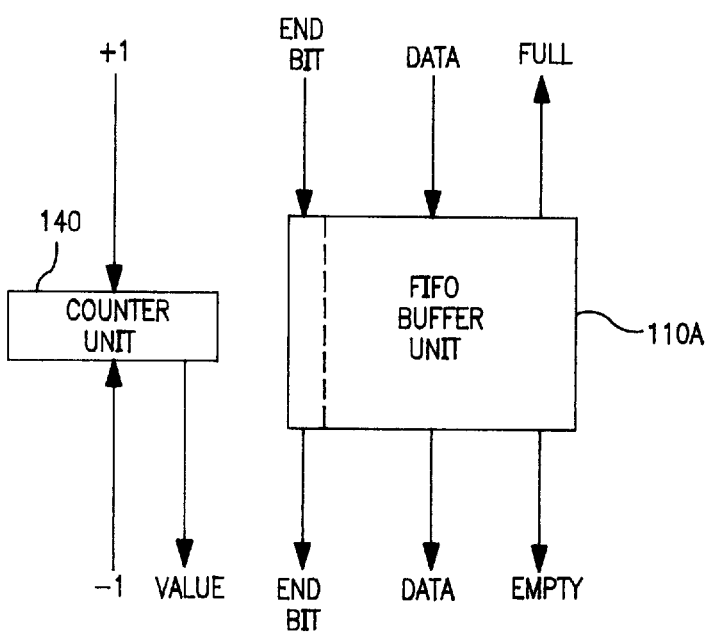
FIG. 7 is a sketch, schematically illustrating the concept of an embodiment in which FIFO buffer unit 110A has attached to each packet stored in FIFO buffer unit 110 (shown in FIG. 6) one [1] bit datum (end bit) indicating the last bit of a packet.

FIG. 7 is a sketch, schematically illustrating the concept of an embodiment in which FIFO buffer unit 110A has attached to each packet stored in FIFO buffer unit 110 (shown in FIG. 6) one [1] bit datum (end bit) indicating the last bit of a packet. This concept enables the output side of FIFO buffer unit 110A to easily detect a tail end of a packet, while data are taken out from FIFO buffer unit 110A, by monitoring an output value of the end bit outputted together with the data.

Figure 8:
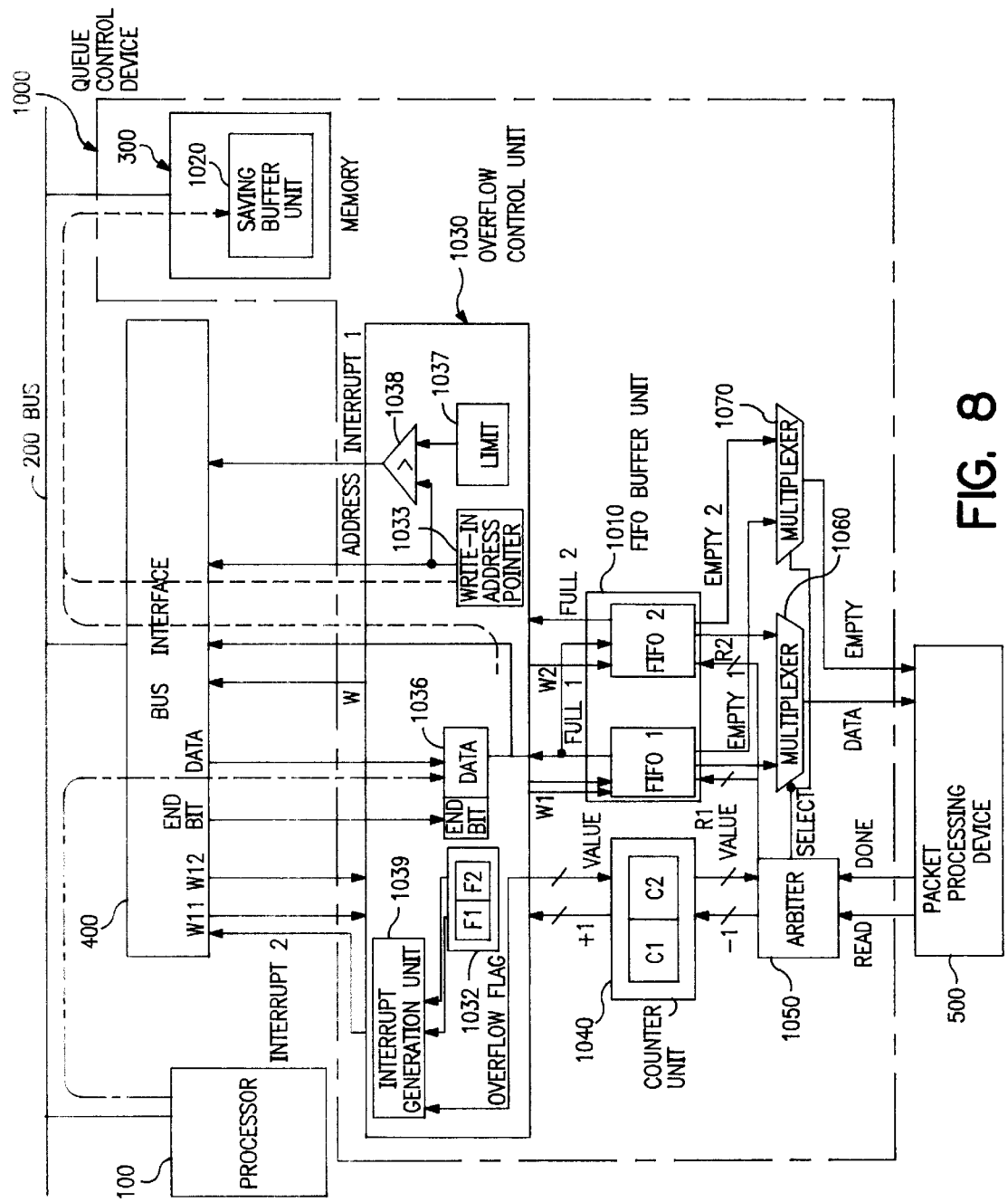
FIG. 8 is a block diagram, illustrating the global configuration of a processor element in a first embodiment of packaging a queue control apparatus 1000.

FIG. 8 is a block diagram, illustrating the global configuration of a processor element in a first embodiment of packaging a queue control apparatus 1000.

A processor 100, formed e.g. by a RISC (Reduced Instruction Set Computer) type processor or a CISC (Complex Instruction Set Computer) type processor, generates a packet, such as a command.

Processor 100 is connected via a bus 200 to a memory 300. Memory 300, is formed e.g. by a DRAM (Dynamic Random Access Memory). Memory 300 secures an area for saving buffer unit 1020 in its inside. Saving buffer unit 1020, having a function equivalent to that of saving buffer unit 120, is used as an area for temporarily saving a packet generated by a processor 100.

Queue control apparatus 1000 in the first embodiment, excepting saving buffer 1020, is connected via a bus interface 400 to bus 200.

Described below is a configuration of queue control apparatus 1000, excepting saving buffer 1020. FIFO buffer unit 1010, comprising two [2] FIFO buffers (FIFO MEMORY 1 and FIFO MEMORY 2), is a FIFO memory functioning as a queue for storing a packet processor 100 writes via bus interface 400. Processor 100 specifies into which one of FIFO MEMORY 1 and FIFO MEMORY 2 data are written, by controlling a write-in request signal W11 or W12 outputted via bus interface 400 to overflow control unit 1030.

A counter unit 1040 comprises counters C1 and C2 corresponding respectively to FIFO MEMORY 1 and FIFO MEMORY 2.

Counters C1 and C2 count the respective numbers of packets stored in FIFO MEMORY 1 and FIFO MEMORY 2.

An overflow control unit 1030 connects FIFO buffer unit 1010 (comprising FIFO MEMORY 1 and FIFO MEMORY 2) and counter unit 1040 (comprising counters C1 and C2) to bus interface 400.

Overflow control unit 1030 comprises a flag 1032, a write-in address pointer 1033, a packet data latch circuit 1036, a limit register 1037, a comparator 1038 and an interrupt generation unit 1039. Flag 1032 has two [2] overflow flags, F1 and F2. Write-in address pointer 1033 specifies a write-in address in saving buffer 1020. Packet data latch circuit 1036 latches packet data. Limit register 1037 stores a limit value (the last storage address) of write-in address pointer 1033 as determined by the size of saving buffer 1020. Comparator 1038 compares an address pointer value of write-in address pointer 1033 with of limit register 1037. Interrupt generation unit 1039 generates an interrupt for use in requesting a data restoration to processor 100, based on the flag statuses of overflow flags F1 and F2 and the counter values of counters C1 and C2.

When Full 1 signal inputted correspondingly from FIFO MEMORY 1 becomes "active", i.e. when FIFO MEMORY 1 becomes "full", overflow flag F1 is "set". Then, when all data saved in saving buffer 1020 are supplied to FIFO buffer unit 1, overflow flag F1 is "cleared" (reset).

Overflow flag F2 operates on FIFO MEMORY 2, just like overflow flag Fl operates on FIFO MEMORY 1.

Initially, the head end address of saving buffer 1020 is set in write-in address pointer 1033. Then, each time saving buffer 1020 saves write-in data for FIFO buffer unit 1010, write-in address pointer 1033 increments its address value by one [1] (i.e. +1). The value of write-in address pointer 1033 is supplied as an address signal (Address) via bus interface 400 and bus 200 to memory 300.

When the address pointer value of write-in address pointer 1033 rises above that of limit register 1037, comparator 1038 supplies an interrupt signal (Interrupt 1) via bus interface 400 and bus 200 to processor 100. The interrupt notifies processor 100 of an effect that saving buffer 1020 has no longer has an available space.

Packet data latch circuit 1036 temporarily stores packet data (Data) to be written into FIFO buffer unit 1010 outputted from processor 100 on to bus 200 and inputted via bus interface 400. Additionally, upon writing last data of a packet, processor 100 activates (sets one [1] to) a signal line of the end bit on bus 200. Packet data latch circuit 1036 also latches the value of the end bit via bus interface 400.

A counter control unit (not shown) in overflow control unit 1030 detects that packet data latch circuit 1036 latches the last data in a packet by detecting that one [1] is set to the end bit packet data latched in packet data latch circuit 1036. Then, after writing the last packet data into FIFO MEMORY 1 or FIFO MEMORY 2, counter unit 1040 increments the counter value of counter C1 or C2 by one [1] (i.e.+1).

Interrupt generation unit 1039 generates an interrupt signal (Interrupt 2), thereby interrupting processor 100 via bus interface 400 and bus 200, while overflow flag F1 or F2 is set, when the counter value of counter C1 or C2 that corresponds to the set one of overflow flag F1 or F2 becomes zero [0] or falls below a predetermined threshold. That is, interrupt generation unit 1039 generates an interrupt, when FIFO MEMORY 1 or FIFO MEMORY 2 stores no packet at all or no more than a predetermined number of packets, while saving buffer 1020 saves write-in data supposed to be written into FIFO buffer unit 1010.

Figure 9A:
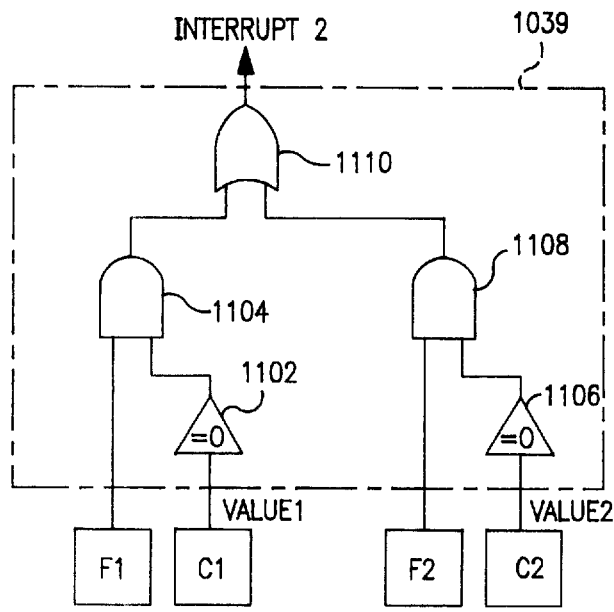
FIG. 9A is a circuit diagram, illustrating a first example of the circuit configuration of interrupt generation unit 1039, shown in FIG. 8.

FIG. 9A is a circuit diagram, illustrating a first example of the circuit configuration of interrupt generation unit 1039 shown in FIG. 8.

Interrupt generation unit 1039, shown in FIG. 9A, generates a common interrupt signal, Interrupt 2, either when overflow flag F1 is set and a counter value 1 of counter C1 (the number of packets stored in FIFO MEMORY 1) is zero [0], or when overflow flag F2 is set and a counter value 2 of counter C2 (the number of packets stored in FIFO MEMORY 2) is zero [0].

When counter value 1 of counter C1 is zero [0], comparator 1102 outputs an "H" signal to one of the input terminals of an AND gate 1104. AND gate 1104 receives, as its input to the other one of the input terminals, the value of overflow flag F1 ("H" for one [1], i.e. for a set status; and "L" for zero [0], i.e. for a clear status). Then, AND gate 1104 outputs an "H" signal to OR gate 1110, when overflow flag F1 is set and counter value 1 of counter C1 is zero [0]. Further, comparator 1106 and an AND gate 1108 provides a circuit for the outputs of overflow flag F2 and counter C2, which is pari passu a circuit for the outputs of overflow flag F1 and counter C1. AND gate 1108 outputs an "H" signal to OR gate 1110, when overflow flag F2 is set and counter value 2 of counter C2 is zero [0].

In this case, processor 100 reads the counter values of counters C1 and C2 via overflow control unit 1030 and bus interface 400, thereby detecting a counter Ci (i=1, 2) whose counter value is zero [0], and thus determining whether or not FIFO MEMORY 1 or FIFO MEMORY 2 has no packet.

Figure 9B:
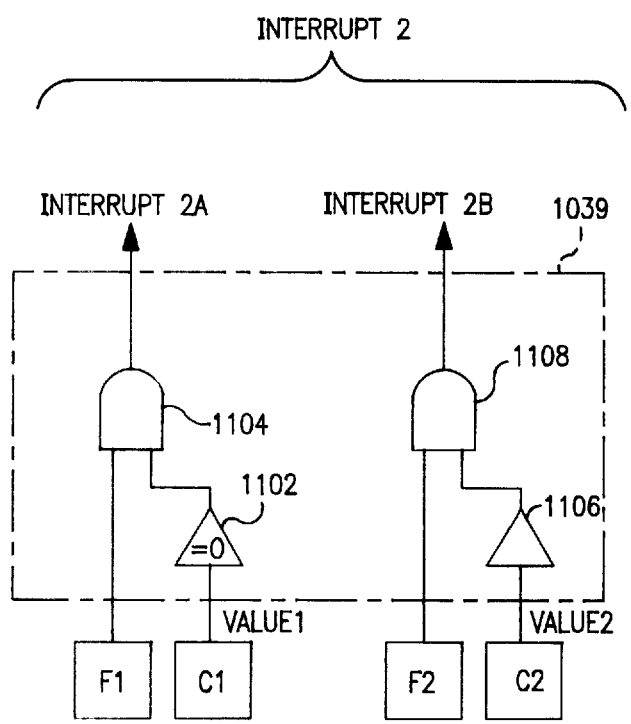
FIG. 9B is a circuit diagram, illustrating a second example of the circuit configuration of interrupt generation unit 1039, shown in FIG. 8.

FIG. 9B is a circuit diagram, illustrating a second example of the circuit configuration of interrupt generation unit 1039, shown in FIG. 8.

The circuit shown in FIG. 9B sheds OR gate 1110 from the circuit shown in FIG. 9A. AND gate 1104 and AND gate 1108 independently supply their respective output signals, as interrupt signals Interrupt 2A and 2B, to bus interface 400. In this case, by receiving either one of interrupt signals, Interrupt 2A and 2B, processor 100 recognizes which one of FIFO MEMORY 1 and FIFO MEMORY 2 stores no packet.

Arbiter 1050 monitors counter values 1 and 2 of counters C1 and C2, and selects an appropriate one of FIFO MEMORY 1 and FIFO MEMORY 2 (FIFO MEMORY i(i=1,2) corresponding to counter Ci (i=1, 2) whose counter value i (i=1, 2) rises above zero [0]) when counter value 1 or 2 rises above zero [0]. Then, arbiter 1050 sequentially reads out packet data from the selected one of FIFO MEMORY 1 and FIFO MEMORY 2 by setting to "enable" a corresponding one of enable signals r1 and r2 supplied thereto. Arbiter 1050 supplies to a multiplexer 1060 the read-out packet data and an input selection signal Select, and inputs into packet processing device 500 packet data read out from the above one of FIFO MEMORY 1 and FIFO MEMORY 2.

Multiplexer 1060 is a data selector receiving as its inputs packet data outputted from FIFO MEMORY 1 and packet data outputted from FIFO MEMORY 2, which arbiter 1050 takes out, and selectively outputs to packet processing device 500 either one of packet data outputted from FIFO MEMORY 1 and packet data outputted from FIFO MEMORY 2, according to an input selection signal Select supplied from arbiter 1050.

Multiplexer 1070 is a signal selector receiving as its inputs an Empty 1 signal 1 from FIFO MEMORY 1 and an Empty 2 signal from FIFO MEMORY 2, and selectively outputs to packet processing device 500 either one of Empty 1 signal outputted from FIFO MEMORY 1 and Empty 2 signal outputted from FIFO MEMORY 2, according to an input selection signal Select supplied from arbiter 1050, as with multiplexer 1060.

Upon starting of a packet processing, packet processing device 500 sends a packet readout request signal "Read" to arbiter, and requests arbiter 1050 to take out a packet stored in FIFO buffer unit 1010.

Upon receiving the packet readout request signal Read, by referring to counter value 1 of counter C1 and counter value 2 of counter C2, arbiter 1050 has packet processing device 500 receive, as its input via multiplexer 1060, either packet data stored in FIFO MEMORY 1 or packet data stored in FIFO MEMORY 2. Upon receiving the last packet data via multiplexer 1060, packet processing device 500 outputs to arbiter 1050 a "Done" signal indicating a completion of packet extraction. Upon receiving the Done signal, arbiter 1050 decrements by one [1] (i.e.–1) counter value i of counter Ci corresponding to FIFO i (i=1,2) from which the packet is taken out. Because packet processing device 500 receives as its input an Empty i signal (i=1,2) via multiplexer 1070, packet processing device 500 can detect that FIFO buffer unit 1010 stores packet data, while the Empty i signal (i=1,2) is non-active.

FIG. 10 is a table, illustrating the format of a packet stored in FIFO buffer unit 1010 (comprising two [2] FIFO memories, FIFO MEMORY 1 and FIFO MEMORY 2) in queue control apparatus 1000, shown in FIG. 8.

A packet has in its head end (in its first word) data indicating the type of a command, and subsequently (in its second word and thereafter) a necessary number of parameters accompanying the command.

Figures 11, 12:
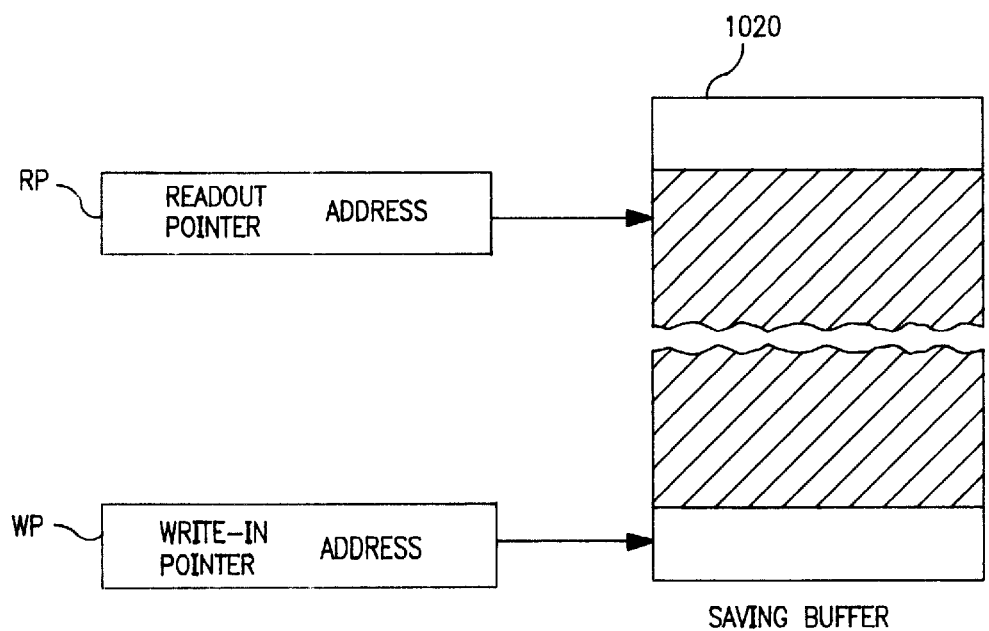
FIG. 11 is a table, illustrating the format of a packet stored in saving buffer 1020 in queue control device 1000, shown in FIG. 8.
FIG. 12 is a sketch, illustrating a concept of saving buffer 1020 for use in a processor element packaging a queue control device 2000, capable of realizing completely with hardware, data restoration from saving buffer 1020 to FIFO buffer 1010.

FIG. 11 is a table, illustrating the format of a packet stored in saving buffer unit 1020 in queue control apparatus 1000 shown in FIG. 8.

A packet shown in FIG. 11 structures each word to have additional data comprising an end bit indicating whether or not the corresponding packet data are the last data of the packet, and a queue number indicating the FIFO memory to which packet data are supplied(i.e. "1" for FIFO MEMORY 1 and "2" for FIFO MEMORY 2), in addition to packet data. The end bit is valid e.g. when it is "1". Upon restoring to the corresponding one of FIFO MEMORY i (i=1, 2) packet data saved in saving buffer 1020, processor 100 refers to the additional data.

Explained below is the operation of a processor element of the above configuration.

Upon generating a packet, processor 100 splits the packet to match the data bus width of bus 200, and sequentially outputs to bus 200 by setting an appropriate value in each end bit. Then, processor 100 outputs, via a command bus on bus 200 to overflow control unit 1030, a data write-in request signal W11 for writing packet data into FIFO MEMORY 1 or a data write-in request signal W12 for writing packet data into FIFO MEMORY 2 by setting it to an "enable" status.

Upon detecting an output of a data write-in request signal Wi (i=1, 2) set in an "enable" status, bus interface 400 outputs the data write-in request signal Wi to overflow control unit 1030, which has its packet data latch circuit 1036 latch packet data and the value of the end bit outputted on bus 200.

Overflow control unit 1030 sequentially writes, into FIFO MEMORY i to which a write-in request is issued, packet data thus latched in packet data latch circuit 1036. Then, after processor 100 outputs on bus 200 the last data of a packet together with the value of the end bit, which is set to one [1], overflow control unit 1030 writes the last data of the packet into the corresponding FIFO MEMORY i, and has the corresponding counter Ci increment by one [1] (i.e.+1) its counter value i.

Thus, processor 100 writes a packet into either one of FIFO MEMORY 1 and FIFO MEMORY 2 of FIFO buffer unit 1010, and overflow control unit 1030 counts the number of packets written into FIFO MEMORY 1 as counter value 1 of counter C1 and the number of packets written into FIFO MEMORY 2 as counter value 2 of counter C2.

Arbiter 1050 constantly monitors counter value 1 of counter C1 or counter value 2 of counter C2 counters C1 and C2, and selects, as a queue from which a packet is taken out, an appropriate one of FIFO MEMORY 1 and FIFO MEMORY 2 by controlling multiplexer 1060, when counter value 1 of counter C1 or counter value 2 of counter C2 rises above zero [0]. Also, accompanying this control, multiplexer 1070 supplies to packet processing device 500 an "Empty" signal, which is set to a non-active status. The Empty signal set to a non-active status indicates that FIFO buffer unit 1010 stores packet data in either or both of FIFO MEMORY 1 or FIFO MEMORY 2.

Upon receiving from multiplexer 1070 Empty signal, which is set to a non-active status, packet processing device 500 sets to an active status Read signal outputted to arbiter 1050 and issues a request for receiving a packet. Upon receiving this request, arbiter 1050 outputs, to the appropriate one of FIFO MEMORY 1 and FIFO MEMORY 2, a corresponding one of a read enable signal r1 and a read enable signal r2 by setting it to an "enable" status, and sequentially read packet data out from FIFO MEMORY i (i=1, 2) to which the enabled one of read enable signal r1 and read enable signal r2 is outputted. When both counters C1 and C2 have counters C1 and C2 have counter values 1 and 2 greater than zero [0], for example, arbiter 1050 selects with priority FIFO MEMORY i having a larger counter value, i.e. storing a larger number of packets. Then, by controlling multiplexer 1060, arbiter 1050 sequentially inputs into packet processing device 500 packet data read out from the selected FIFO MEMORY i (i=1, 2).

Packet processing device 500 starts a packet processing by sequentially taking in packet data read out from the selected FIFO MEMORY i. Then, upon taking the last data of a packet, packet processing device 500 sends a "Done" signal to arbiter 1050. Upon receiving Done signal, arbiter 1050 has counter Ci decrement its counter value i by one [1] (i.e.–1), in correspondence with the selected FIFO MEMORY i. That is, because FIFO MEMORY i reduces by one [1] the number of packets it stores, counter Ci decrements its counter value i by one [1] (i.e. –1). Packet processing device 500 detects a completion of a packet extraction by its stored data e.g. on the total length of a command.

If processor 100 supplies packets to FIFO buffer unit 1010 faster than packet processing device 500 takes packets out from the same, FIFO MEMORY 1 or FIFO MEMORY 2 in FIFO buffer unit 1010 may become full eventually.

In such a case, upon receiving from processor 100 a request to write packet data into a FIFO MEMORY i, which is currently full, overflow control unit 1030 writes packet data having the write-in request into an address specified by pointer 1033 of saving buffer 1020, in a format shown in FIG. 11, and sets corresponding overflow flag Fi. Once overflow flag Fi is set in this manner, overflow control unit 1030 writes into saving buffer 1020 a packet which processor 100 requests FIFO MEMORY i to store, by updating an address in pointer 1033.

Accordingly, while packets are written into saving buffer 1020, packet processing device 500 sequentially takes out packets from FIFO MEMORY i which has been full. Then, eventually FIFO MEMORY i stores no packets. That is, counter value i of counter Ci corresponding to the selected FIFO MEMORY i becomes zero [0]. This causes overflow control unit 1030 to supply interrupt signal Interrupt 2 from interrupt generation unit 1039 to processor 100.

The interrupt causes processor 100 to execute a corresponding interrupt processing routine, to read packet data to be supplied to FIFO MEMORY i from saving buffer 1020, and to write the packet data into the FIFO MEMORY i. Then, when saving buffer 1020 has no packet data to be supplied to FIFO MEMORY i as a result, processor 100 clears (resets) the corresponding overflow flag Fi. A clearance of the corresponding overflow flag Fi allows overflow control unit 1030 to write into FIFO MEMORY i packet data about which processor 100 issues a write-in request, until FIFO MEMORY i becomes full, again.

Meanwhile, when saving buffer 1020 still has packet data to be supplied to FIFO MEMORY i during a data restoration from saving buffer 1020 to FIFO MEMORY i, processor 100 does not clear (reset) overflow flag Fi. Hence, in such a case, overflow control unit 1030 continues to write into saving buffer 1020 data from processor 100 supposed to be supplied to FIFO MEMORY i. This is because, packets saving buffer 1020 still has packet data to be supplied first to FIFO MEMORY i, in this case.

Incidentally, there is a case in which FIFO MEMORY i becomes full while a packet supplies data into FIFO MEMORY i, and saving buffer 1020 stores subsequent data. In such a case, because counter Ci does not increment its counter value i by one [1] (i.e.+1), FIFO MEMORY i is not regarded as storing a packet. Then, when all remaining data saved in saving buffer 1020 are transferred to FIFO MEMORY i, processor 100 has counter Ci increment counter value i by one [1] (i.e.+1). This enables packet processing device 500 to efficiently extract a packet from FIFO MEMORY i anytime when FIFO MEMORY i has a complete packet.

Furthermore, there is a case in which packet data overflow from saving buffer 1020. In such a case, comparator 1038 supplies an interrupt signal Interrupt 1 to processor 100. Upon receiving this interrupt, processor 100 executes a processing for expanding the size e.g. of saving buffer 1020 on memory 300, and correspondingly updates the value of limit register 1037.

FIG. 12 is a sketch, illustrating a concept of saving buffer 1020 for use in a processor element packaging a queue control apparatus 2000, capable of realizing, completely with hardware, data restoration from saving buffer 1020 to FIFO buffer unit 1010.

In the first embodiment described above, processor 100 executes a data restoration from saving buffer 1020 to FIFO buffer unit 1010 through a software processing. However, in a second embodiment described below, processor 100 executes a data restoration from saving buffer 1020 to FIFO buffer unit 1010 through a hardware processing.

In the second embodiment, whose concept is schematically shown in FIG. 12, saving buffer 1020 is provided with a readout address pointer RP for specifying a storage address of the head end packet data to be read out from saving buffer 1020, in addition to a write-in address pointer WP (corresponding to pointer 1033 shown in FIG. 8). This enables saving buffer 1020 to be treated as a ring buffer. Then, upon detecting that FIFO buffer unit 1010 stores no data at all, data saved in saving buffer 1020 are read out from an address specified by the readout address pointer RP to be outputted to FIFO buffer unit 1010. Further, when this data output causes saving buffer 1020 to store no data at all, flag 1032 is reset (cleared) indicating that saving buffer 1020 saves data. Hardware realizes the series of processing.

Figure 13:
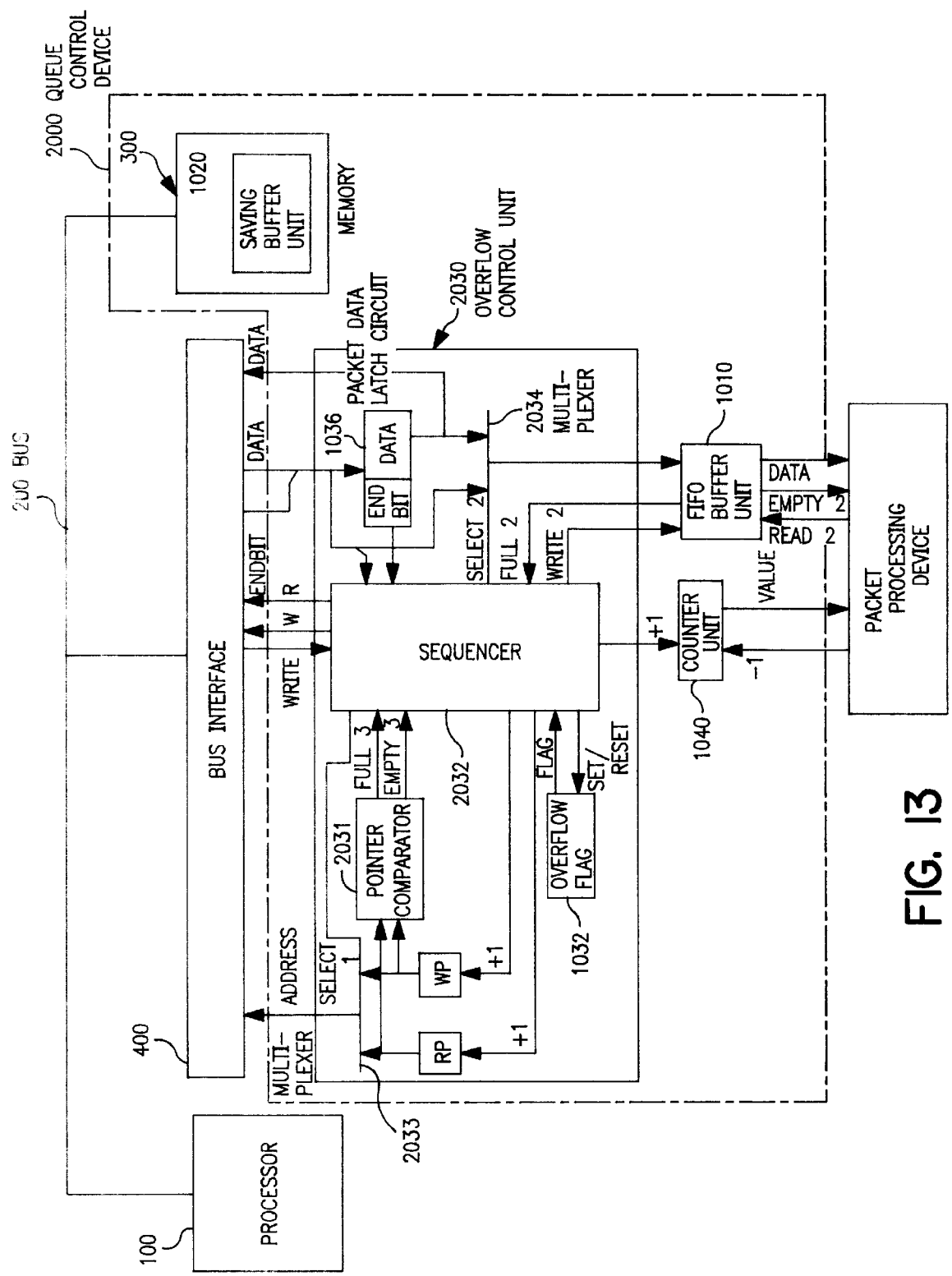
FIG. 13 is a block diagram, illustrating the global configuration of a processor element in a second embodiment of packaging a queue control device 2000.

FIG. 13 is a block diagram, illustrating the global configuration of a processor element in a second embodiment of packaging a queue control apparatus 2000, capable of realizing, completely with hardware, a data restoration from saving buffer 1020 to FIFO buffer unit 1010.

Parts of the second embodiment shown in FIG. 13, which are the same as those of the first embodiment, shown in FIG. 8, have the same numbers, and they are not explained in detail here.

In the second embodiment, FIFO buffer unit 1010 comprises only one [1] FIFO memory, and counter unit 1040 is provided correspondingly for counting the number of packets stored in FIFO buffer unit 1010.

As with overflow control unit 1030 in the first embodiment, shown in FIG. 8, overflow control unit 2030 in the second embodiment, shown in FIG. 13, comprises a packet data latch circuit 1036 and a flag 1032. Flag 1032 indicates that saving buffer 1020 saves packet data supposed to be written into FIFO buffer unit 1010. In addition to packet data latch circuit 1036 and flag 1032, overflow control unit 2030 further comprises write-in address pointer WP and readout address pointer RP provided for saving buffer 1020, a pointer comparator 2031, a sequencer 2032 and two [2] multiplexers 2033 and 2034.

Pointer comparator 2031 detects whether or not saving buffer 1020 is currently empty or full by comparing the inputted values of the two [2] pointers WP and RP. Then, pointer comparator 2031 outputs to sequencer 2032 an Empty 3 signal when saving buffer 1020 is empty, and a Full 3 signal when saving buffer 1020 is full. Inasmuch as saving buffer 1020 has a ring buffer configuration as described above, the values of both pointers match when saving buffer 1020 is empty, and the values of both pointers specify neighboring addresses on the ring buffer when saving buffer 1020 is full.

Sequencer 2032 controls the entirety of overflow control unit 2030, receives from processor 100 via bus interface 400 a write-in request signal Write for writing into FIFO buffer unit 1010 packet data and its accompanying end bit data, and has packet data latch circuit 1036 latch the packet data and end bit data.

Multiplexer 2033 outputs either value of write-in address pointer WP and readout address pointer RP to bus interface 400 as an address signal, according to an input selection signal Select 1 supplied from sequencer 2032. The address signal is sent via bus 200 to memory 300. That is, when saving buffer 1020 saves data supposed to be supplied to FIFO buffer unit 1010, sequencer 2032 controls multiplexer 2033, so that multiplexer 2033 selectively outputs the value of write-in address pointer WP. Moreover, when FIFO buffer unit 1010 restores data saved in saving buffer 1020, sequencer 2032 controls multiplexer 2033, so that multiplexer 2033 selectively outputs the value of readout address pointer RP.

According to input selection signal Select 2 supplied from sequencer 2032, multiplexer 2034 selectively outputs to FIFO buffer unit 1010 either one of write-in data of processor 100 latched in packet data latch circuit 1036 and data to be restored and read out from saving buffer 1020. That is, upon writing directly into FIFO buffer unit 1010 packet data about which processor 100 issues a write-in request, sequencer 2032 controls multiplexer 2033, so that multiplexer 2033 selectively outputs packet data latched in packet data latch circuit 1036. In addition, upon writing into FIFO buffer unit 1010 packet data Data to be restored and read out from saving buffer 1020, sequencer 2032 controls multiplexer 2034, so that multiplexer 2034 selectively outputs packet data for restoring data inputted from bus interface 400.

Also, upon writing packet data outputted from multiplexer 2034 into FIFO buffer unit 1010, sequencer 2032 supplies to FIFO buffer unit 1010 a write-enable signal Write 2 by enabling it.

When packet data latch circuit 1036 latches the last data of a packet, sequencer 2032 recognizes that packet data latch circuit 1036 latches the last data of a packet by the value of an end bit latched together with the packet data. Then, after writing the data of a packet into FIFO buffer unit 1010, sequencer 2032 increments the value of counters 1040 by one [1] (i.e.+1).

FIG. 14 is a table, illustrating the format of a packet stored in saving buffer 1020 in queue control apparatus 2000, shown in FIG. 13.

Since the second embodiment assumes that a single chip packages only one [1] FIFO buffer unit 1010, as shown in FIG. 14, the format of packet data stored in saving buffer 1020 of the second embodiment is different only than that of the first embodiment in that an end bit is attached to a word. Upon reading out packet data for restoring data from saving buffer 1020 to FIFO buffer unit 1010, sequencer 2032 detects by the datum on the end bit that the last data of a packet is read. Then, after restoring the last data to FIFO buffer unit 1010, sequencer 2032 has counter unit 1040 increment its counter value by one [1] (i.e.+1). Furthermore, upon reading from FIFO buffer unit 1010 the last data of a packet, packet processing device 500 has counter unit 1040 decrement its counter value by one [1] (i.e.−1).

Figure 15:
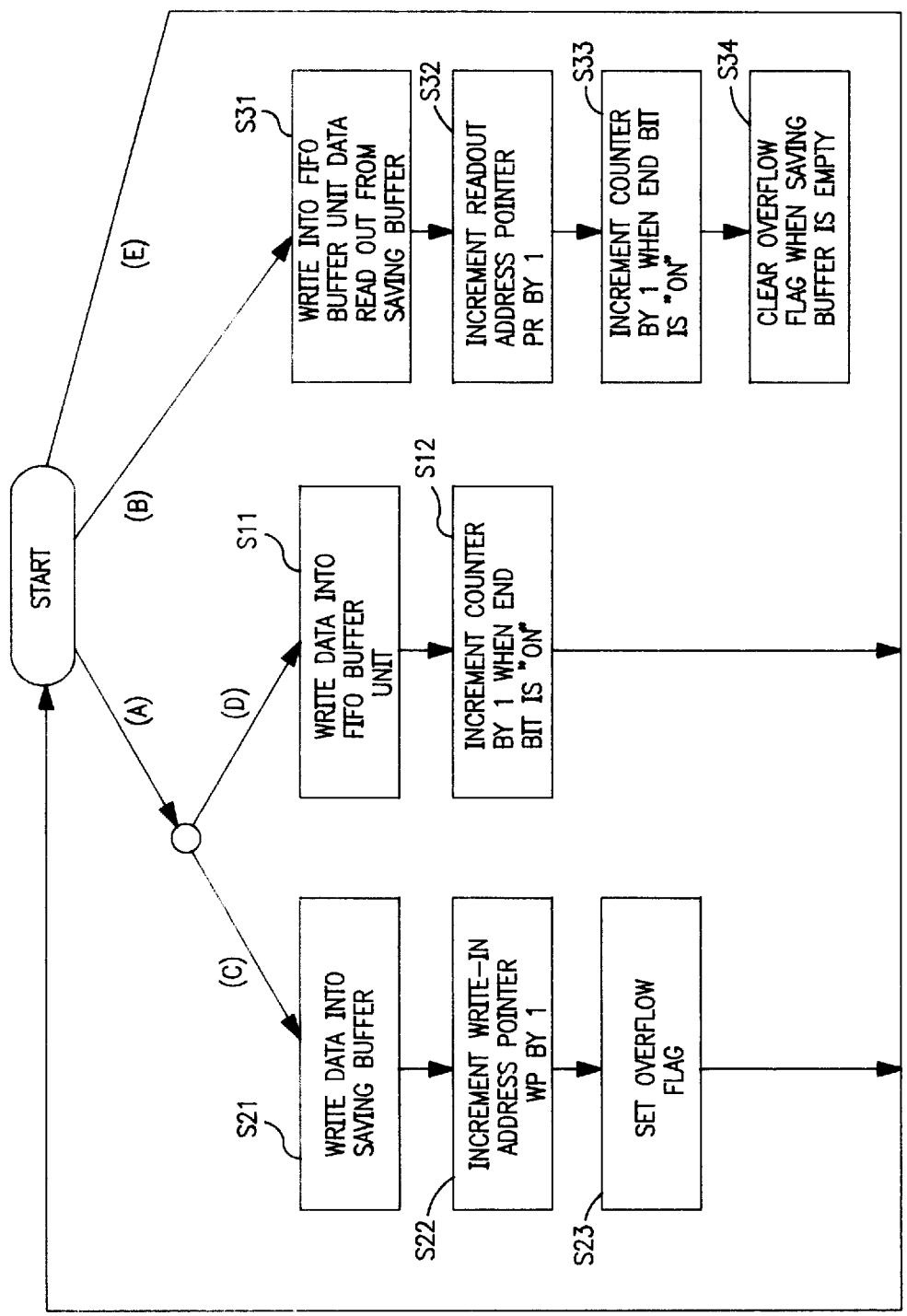
FIG. 15 is a flowchart, illustrating an operation of queue control device 2000, shown in FIG. 13.

FIG. 15 is a flowchart, illustrating an operation of queue control apparatus 2000, shown in FIG. 13.

Overflow control unit 2030 has its sequencer 2032 perform the following determinations (A) through (E).

(A) When processor 100 issues a write-in request for writing packet data into a queue, i.e. FIFO buffer unit 1010, overflow control unit 2030 has its sequencer 2032 determine whether or not saving buffer 1020 has an available space, according to whether or not Full 3 signal inputted from pointer comparator 2031 is active.

(B) By referring to flag data set in flag 1032, and by determining whether or not flag is 1032 is set, overflow control unit 2030 has its sequencer 2032 determine whether or not saving buffer 1020 currently saves overflown data. A positive determination causes overflow control unit 2030 to have its sequencer 2032 determine next the status of Full 2 signal from FIFO buffer unit 1010, thereby determining whether or not FIFO buffer unit 1010 currently has an available space.

(C) If determination (A) ascertains that saving buffer 1020 currently has an available space, overflow control unit 2030 has its sequencer 2032 determine whether or not overflow flag 1032 is set, i.e. whether or not FIFO buffer unit 1010 has available space. As described above, flag 1032 being set means that saving buffer 1020 currently saves data.

(D) If determination (A) ascertains that saving buffer 1020 currently has an available space, overflow control unit 2030 has its sequencer 2032 determine whether or not flag 1032 is reset and FIFO buffer unit 1010 has an available space.

(E) Upon determining that neither a condition for performing determination (A) nor a condition for performing determination (B) exist at a START, overflow control unit 2030 has its sequencer 2032 repeat processes from START to START in a loop. Alternatively, when saving buffer 1020 has no available space, overflow control unit 2030 has its sequencer 2032 secure a new saving area for saving data therein.

After performing the above determinations (A) through (E), overflow control unit 2030 has its sequencer 2032 write, into either one of FIFO buffer unit 1010 and saving buffer 1020, packet data about which processor 100 issues a write-in request to a queue, according to the determination results.

Furthermore, overflow control unit 2030 has its sequencer 2032 restore, in FIFO buffer unit 1010, packet data saved in saving buffer 1020.

That is, upon starting a system operation, flag 1032 is naturally reset in determination (D), and it is recognized that FIFO buffer unit 1010 has an available space. Thus, write-in request data from processor 100 to a queue are written sequentially into FIFO buffer unit 1010 (step S11). Then, when an end bit attached to packet data of FIFO buffer unit 1010 is "on", i.e. when the last data of a packet are written into FIFO buffer unit 1010, counters 1040 increments its counter value by one [1] (i.e.+1) (step S12). This sets in counters 1040 the number of packets stored in FIFO buffer unit 1010. Thereafter, processes in steps S11 and S12 cause write-in data of processor 100, supposed to be written into a queue, to be written into FIFO buffer unit 1010.

When FIFO buffer unit 1010 finally has no available space, Full 2 signal outputted from FIFO buffer unit 1010 becomes "active". This enables sequencer 2032 to detect that FIFO buffer unit 1010 is full in determination (C). Then, overflow control unit 2030 has sequencer 2032 write into saving buffer 1020 subsequent write-in data from processor 100 supposed to be written into a queue. At this time, as shown in FIG. 14, write-in data carry an "end bit" (step S21). Then, after writing the data, overflow control unit 2030 has sequencer 2032 increment the value of write-in address pointer WP by one [1] (+1) (step S22). Overflow control unit 2030 has sequencer 2032 set overflow flag 1032 "on" (step S23). Overflow control unit 2030 has sequencer 2032 process steps S21 through S23 and write the packet data in saving buffer 1020, upon each write-in request of packet data from processor 100 to a queue, when overflow flag 1032 is set "on".

Thereafter, packet processing device 500 takes a packet out from FIFO buffer unit 1010. When FIFO buffer unit 1010 has an available space, Full 2 signal outputted from FIFO buffer unit 1010 becomes non-active. Overflow control unit 2030 has sequencer 2032 detect that FIFO buffer unit 1010 has an available space in determination (B). Also, overflow control unit 2030 has sequencer 2032 detect that saving buffer 1020 stores overflown data (saved data) by overflow flag 1032 being set.

Overflow control unit 2030 has sequencer 2032 read packet data out from an address readout address pointer RP of saving buffer 1020, and write the packet data into FIFO buffer unit 1010 (step S31). Then, overflow control unit 2030 has sequencer 2032 increment the value of readout address pointer RP by one [1] (+1) (step S32). Then, overflow control unit 2030 has sequencer 2032 increment the value of counter unit 1040 by one [1] (+1), when an end bit attached to packet data written into FIFO buffer unit 1010 is set "on". That is, overflow control unit 2030 has sequencer 2032 increment the value of counter unit 1040 by one [1] (+1), each time FIFO buffer unit 1010 restores one [1] packet (step S33). Thereafter, overflow control unit 2030 has sequencer 2032 check the status of Empty 3 signal inputted from pointer comparator 2031 and determine whether or not saving buffer 1020 stores no data at all. When saving buffer 1020 saves no packet data, overflow control unit 2030 has sequencer 2032 clear (reset) overflow flag 1032 (step S34).

Overflow control unit 2030 has sequencer 2032 execute the processes in steps S31 through S34, e.g. during an absence of a write-in request of packet data from processor 100 to queue, on an as-necessary basis.

This allows data to be restored from saving buffer 1020 to FIFO buffer unit 1010 without hindering the operation of processor 100, by using time slots on bus 200 not occupied by processor 100.

Figure 16:
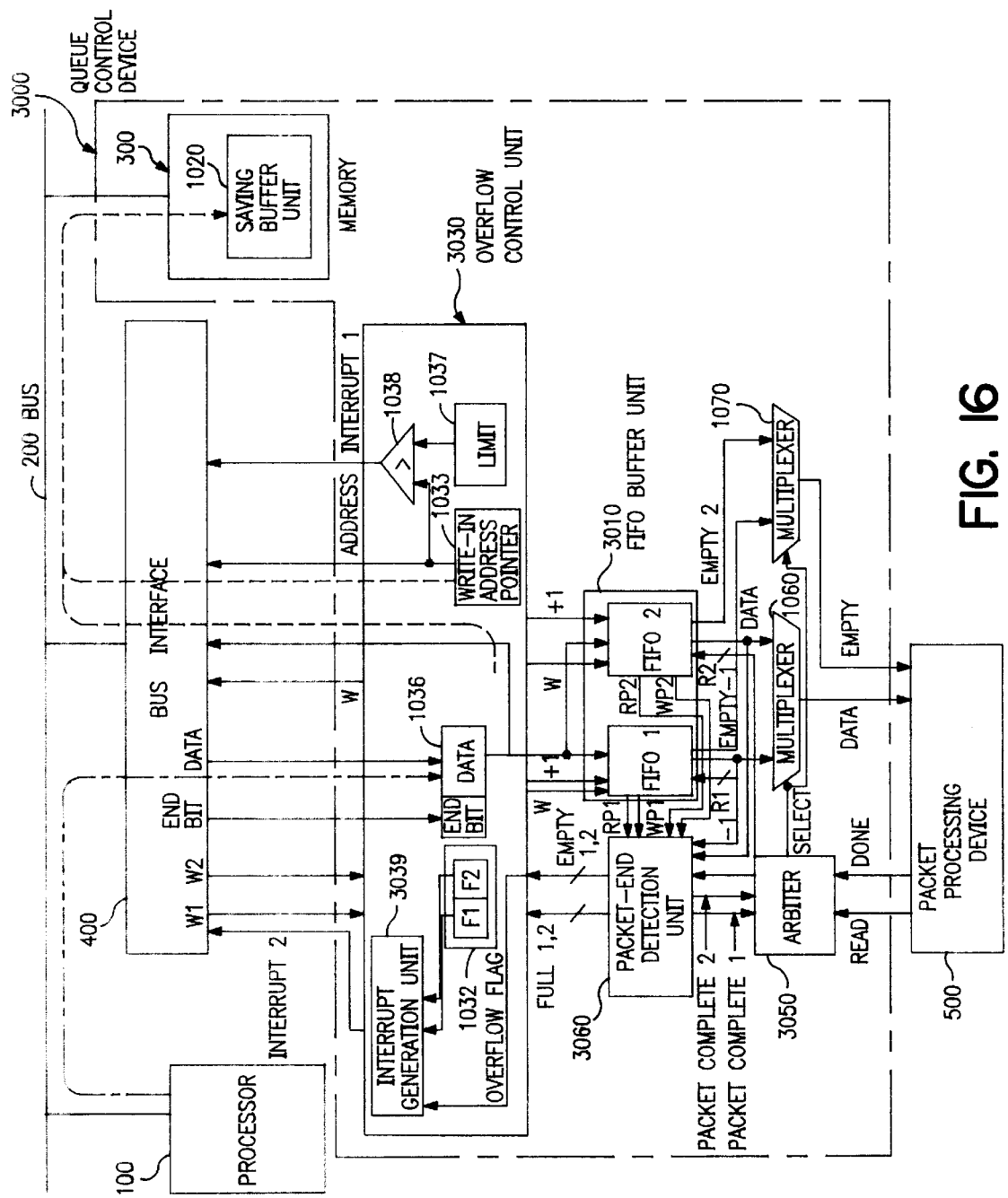
FIG. 16 is a block diagram, illustrating the global configuration of a processor element in a third embodiment of packaging a queue control apparatus 3000.

FIG. 16 is a block diagram, illustrating the global configuration of a processor element in a third embodiment of packaging a queue control apparatus 3000.

Parts of the third embodiment shown in FIG. 16, which are the same as those of the first embodiment, shown in FIG. 8, have the same numbers, and they are not explained in detail here.

FIFO buffer unit 3010 of the third embodiment comprises two [2] FIFO memories, FIFO MEMORY 1 and FIFO MEMORY 2. FIFO MEMORY 1 and FIFO MEMORY 2 jointly form a ring buffer.

Figure 17:
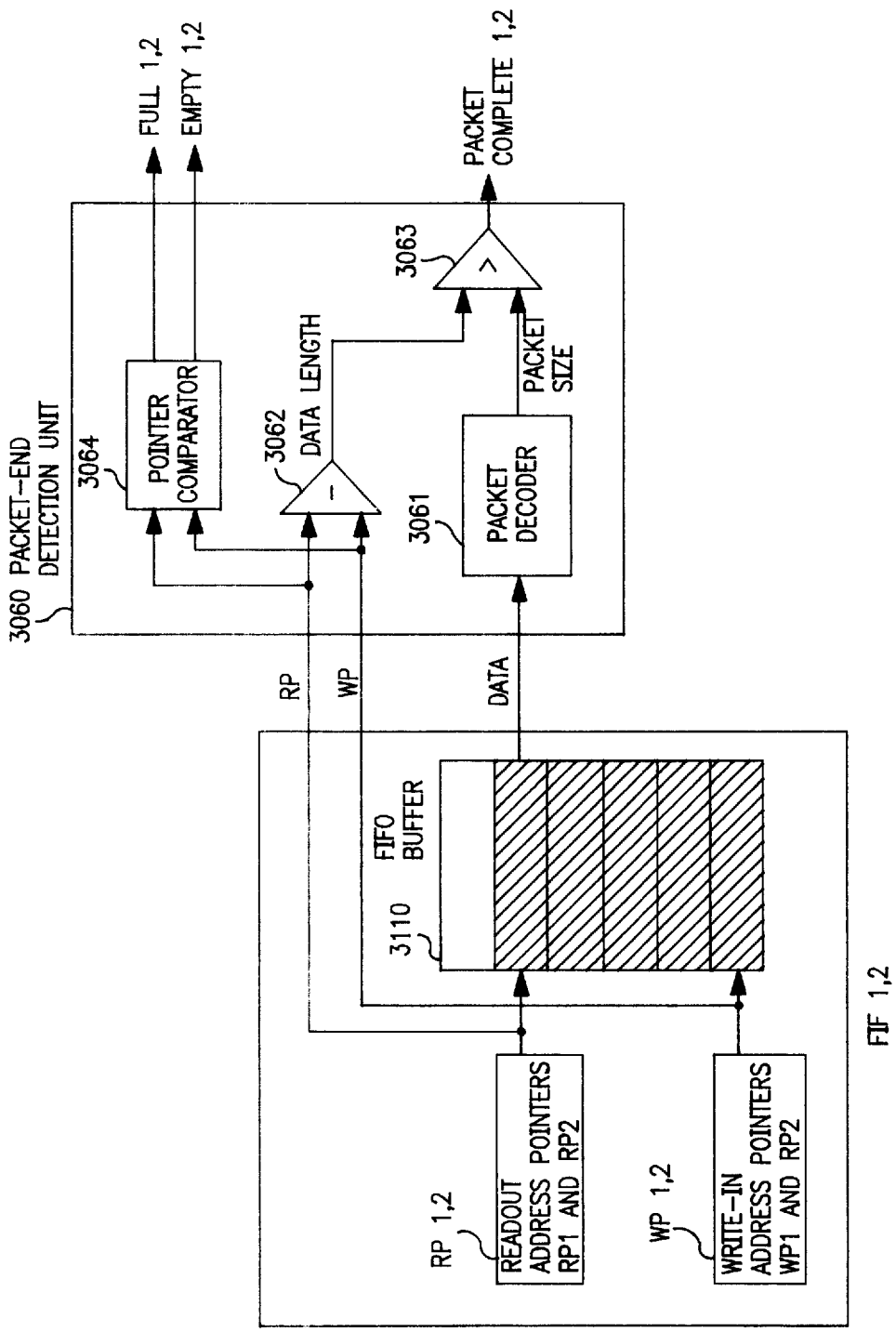
FIG. 17 is a block diagram, illustrating a configuration of FIFO buffer unit 3010, shown in FIG. 16.

FIG. 17 is a block diagram, illustrating a configuration of FIFO buffer unit 3010, shown in FIG. 16.

Each of FIFO MEMORY i (i=1, 2) comprises a FIFO buffer 3110, a write-in address pointer wpi indicating the next address for writing data into FIFO buffer 3110, and a readout address pointer rpi indicating the next address for reading data out of FIFO buffer 3110.

An operation of these two [2] pointers wpi and rpi enables FIFO buffer 3110 to function as an endless buffer.

Figure 18:
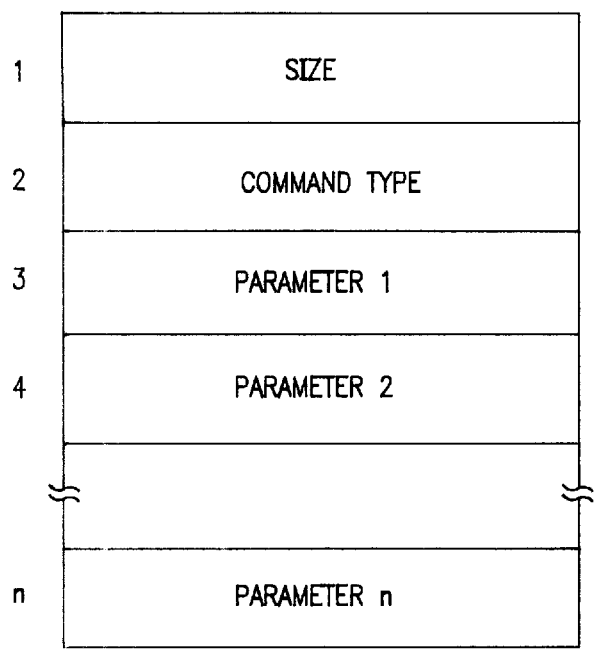
FIG. 18 is a table, illustrating the format of a packet stored in FIFO buffer unit 3010 (comprising two [2] FIFO memories, FIFO MEMORY 1 and FIFO MEMORY 2) in queue control apparatus 3000, own in FIG. 16.

FIG. 18 is a table, illustrating the format of a packet stored in FIFO buffer unit 3010 (comprising two [2] FIFO memories, FIFO MEMORY 1 and FIFO MEMORY 2) in queue control apparatus 3000, shown in FIG. 16.

As with FIFO buffer 3010, a packet-end detection unit 3060 provides for its sub-units corresponding respectively to FIFO MEMORY 1 and FIFO MEMORY 2. The packet-end detection unit 3060 detects whether or not each of FIFO MEMORY 1 and FIFO MEMORY 2 stores a complete packet, and sets to "active" the corresponding one of its external outputs, i.e. a Packet Complete signal 1 and a Packet Complete signal 2, when either of FIFO MEMORY 1 and FIFO MEMORY 2 stores at least one [1] complete packet. Arbiter 3050 receives, as its inputs, Packet Complete signal 1 and Packet Complete signal 2. Then, arbiter 3050 controls multiplexer 1060 and multiplexer 1070, according to Packet Complete signal 1 and Packet Complete signal 2. That is, Packet Complete signal 1 and Packet Complete signal 2 function for arbiter 3050 as alternates of counter C1 and counter C2 in counter unit 1040 of the second embodiment shown in FIG. 13. Furthermore, arbiter 3050 updates readout address pointers rp1 and rp2, upon each readout of packet data from FIFO MEMORY 1 and FIFO MEMORY 2, respectively. Sequencer (not shown) in overflow control unit 3030 operates write-in address pointers wp1 and wp2.

Returning to FIG. 17, explained below is an internal circuit configuration of packet-end detection unit 3060.

A packet decoder 3061 decodes data of the head end word of a packet stored in each of FIFO MEMORY 1 and FIFO MEMORY 2, and outputs to comparator 3063 a packet length (packet size) indicating an overall size of the packet.

An operator 3062 receives, as its input, the values of two [2] pointers rp and wp from FIFO MEMORY 1 and FIFO MEMORY 2, obtains from both pointer values data lengths indicating the respective numbers of packet data sets (the number of words) stored in FIFO MEMORY 1 and FIFO MEMORY 2, and outputs them to comparator 3063.

A comparator 3063 compares a packet length inputted from packet decoder 3061 with a data length inputted from operator 3062. Then, when the data length is no less than the packet length, comparator 3063 sets to "active" Packet Complete signal 1 and Packet Complete signal 2 supplied to arbiter 3050, thereby indicating that packets are complete in FIFO MEMORY 1 and FIFO MEMORY 2.

A pointer comparator 3064 operates similarly with pointer comparator 2031 of the second embodiment shown in FIG. 13, which is described earlier. Pointer comparator 3064 receives, as its inputs from FIFO MEMORY 1 and FIFO MEMORY 2, the two [2] pointer values of a readout address pointer rp (rp1 or rp2) and a write-in address pointer wp (wp1 or wp2), compares their pointer values, generates a Full Flag 1 signal and a full Flag 2 signal, which respectively indicate that FIFO MEMORY 1 and FIFO MEMORY 2 are "full", as well as, an Empty Flag 1 signal and an Empty Flag 2 signal, which respectively indicate that FIFO MEMORY 1 and FIFO MEMORY 2 are "empty", and outputs them to overflow control unit 3030.

Figure 19A:
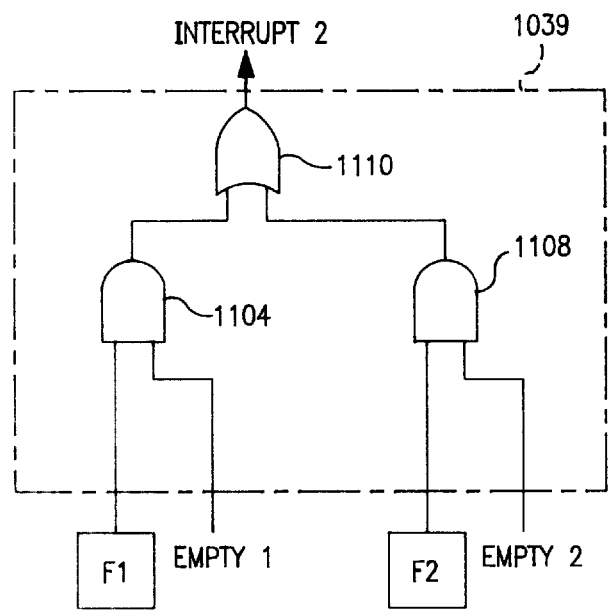
FIGS. 19A and 19B are circuit diagrams, illustrating, in a two-part series, the configuration of an interrupt generation unit 3039 in an overflow control unit 3030, shown in FIG. 16.
Figure 19B:
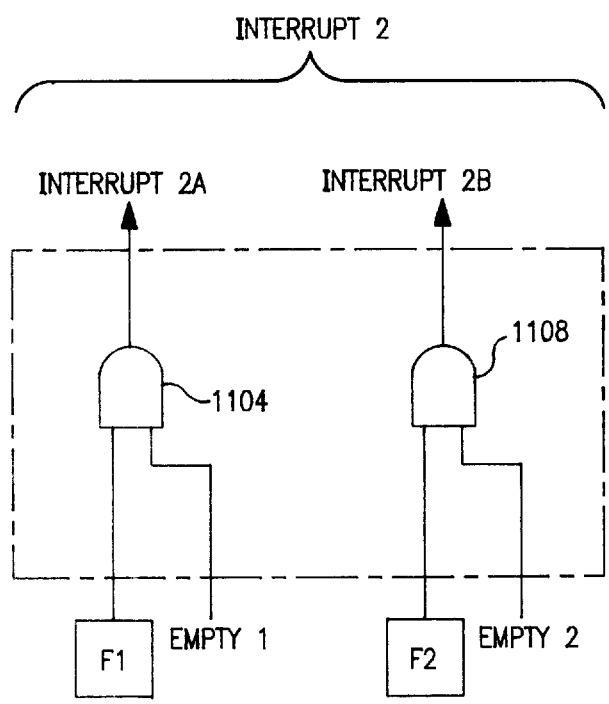

FIGS. 19A and 19B are circuit diagrams, illustrating, in a two-part series, the configuration of an interrupt generation unit 3039 in an overflow control unit 3030, shown in FIG. 16.

As shown in FIG. 18, the head end of a packet (the first word) has size data indicating the total length of a packet.

As shown in FIG. 19A and FIG. 19B, interrupt generation unit 3039 has a configuration obtained by shedding comparators 1102 and 1106 from interrupt generation unit 1039 of the first embodiment, shown in FIG. 8. AND gates 1104 and 1108 receive, as their respective inputs, Empty Flag signal 1 and Empty Flag signal 2 outputted from packet-end detection unit 3060. Then, as with interrupt generation unit 1039, interrupt generation unit 3039 sets interrupt signal Interrupt 2 to "active" for interrupting an operation of processor 100, when FIFO MEMORY i has an available space (i.e. when Empty Flag i is set to "active") while overflow flag Fi (i=1, 2) is set.

In the third embodiment, packet processing device 500 takes out a packet, when packets are complete in FIFO buffer unit 1010. In other words, packet processing device 500 prevents FIFO buffer unit 1010 from outputting packet data of an incomplete packet, when packets are incomplete in FIFO buffer unit 1010.

Accordingly, processor 100 enables, through its software processing, a packet to be complete in FIFO buffer unit 1010, as with any other packets, by taking out from FIFO buffer unit 1010 partial data of incomplete packet once inputted to FIFO buffer unit 1010, by temporarily saving in saving buffer 1020 (or in a saving area not shown) on memory 300, and by restoring to FIFO buffer unit 1010 packet data saved in saving buffer 1020.

Such a function is particularly effective when processor 100 supports a multi-program processing.

In such a situation, there may be a case in which an execution right is switched (changed) to another process, which causes a packet to be written into FIFO buffer 3110, when a plurality of processes (a process is defined here as a running unit of a single program) share, as a queue, one [1] FIFO buffer 3110 (in FIFO MEMORY 1 or FIFO MEMORY 2), while a process causes a packet to be written into FIFO buffer 3110.

In such a case, a use of the function in both processes enables a packet to be properly written into FIFO buffer unit 1010.

Figure 20:
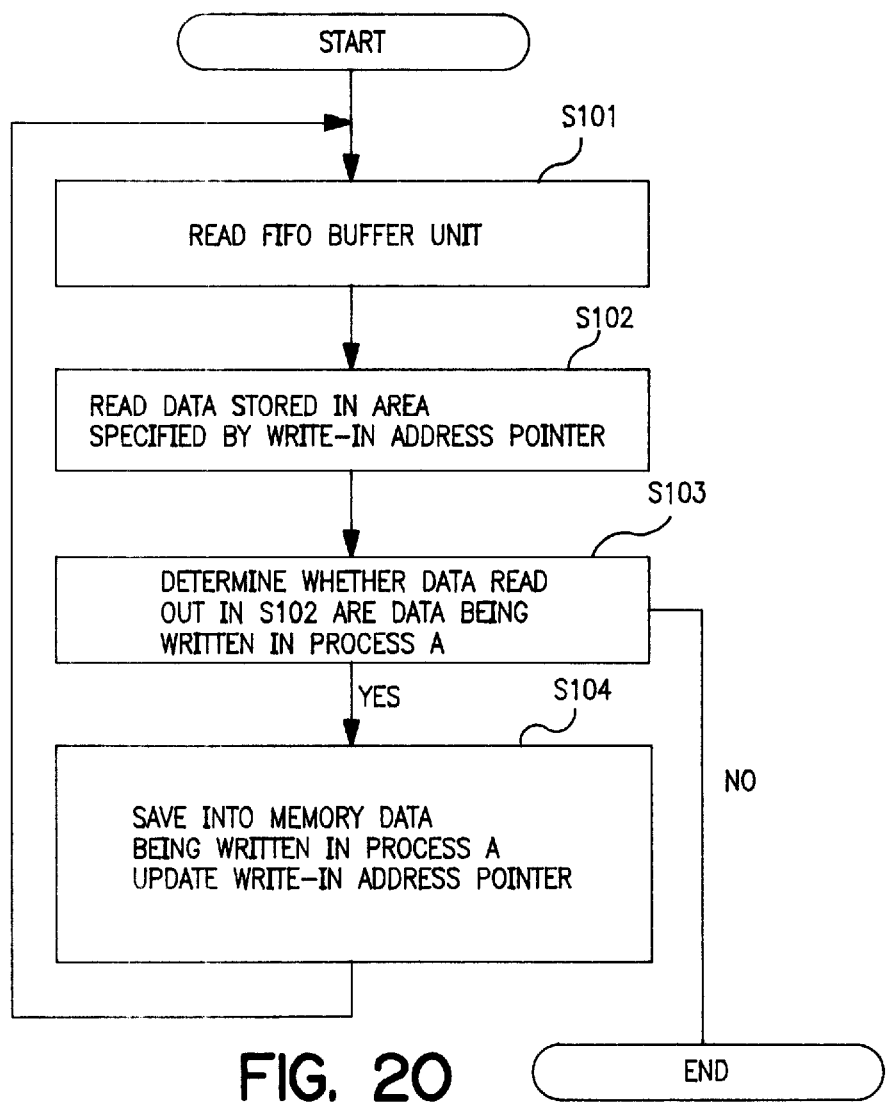
FIG. 20 is a flowchart, illustrating an operation of processor 100, when it suspends an execution of process A and switches to an execution of process B, which shares, as a queue, the same FIFO buffer, i.e. FIFO buffer unit 1010, shown in FIG. 8 and FIG. 13, or FIFO buffer unit 3010, shown in FIG. 16.
Figure 21:
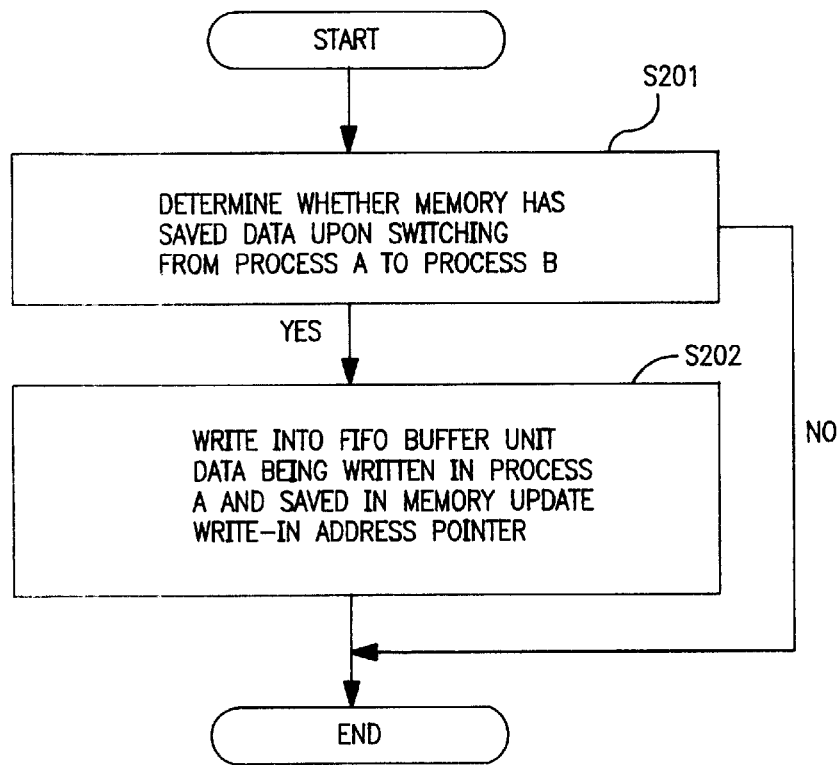
FIG. 21 is a flowchart, illustrating an operation of processor 100, when it terminates an execution of process B, shown in FIG. 20, and resumes an execution of process A, shown in FIG. 20.

FIG. 20 and FIG. 21 are flowcharts, illustrating operations of processor 100 and any of the queue control apparatus 1000, shown in FIG. 8, queue control apparatus 2000, shown in FIG. 13 or queue control apparatus 3000, shown in FIG. 16, which collectively realize the above function.

FIG. 20 is a flowchart, illustrating an operation of processor 100, when it suspends an execution of process A and switches to an execution of process B, which shares, as a queue, the same FIFO buffer, i.e. FIFO buffer unit 1010, shown in FIG. 8 and FIG. 13, or FIFO buffer unit 3010, shown in FIG. 16.

In this case, processor 100 reads the value of a write-in address pointer wp (wp1 or wp2) from FIFO buffer unit 1010 via overflow control unit 1030 (,2030 or 3030) (step S101).

Then, processor 100 reads data at a data storage address preceding the address specified as a pointer value by write-in address pointer wp (wp1 or wp2) from FIFO buffer unit 1010 via overflow control unit 1030(, 2030 or 3030) (step S102). Processor 100 determines whether or not the data are incomplete data in a process of being written in by process A (step S103). When the data are incomplete data in a process of being written in by process A (S103, YES), processor 100 saves the data in saving buffer 1020 on memory 300. Then, processor 100 updates the pointer value of write-in address pointer wp (wp1 or wp2) in FIFO buffer unit 1010, accompanying this data saving (step S104).

Processor 100 repeats the processes in steps S101 through S104, until saving buffer 1020 on memory 300 saves, from FIFO buffer unit 1010, all data in a process of being written in by process A. When no data are incomplete data in a process of being written in by process A (S103, NO), processor 100 ends its processes.

The above processes allow an incomplete packet in a process of being written into FIFO buffer unit 1010 during an execution of process A, to be saved in a specific area of saving buffer 1020 on memory 300.

FIG. 21 is a flowchart, illustrating an operation of processor 100, when it terminates an execution of process B, shown in FIG. 20, and resumes an execution of process A, shown in FIG. 20.

Processor 100 checks saving buffer 1020 on memory 300, and determines whether or not saving buffer 1020 has data saved during an execution of process A (step S201). When saving buffer 1020 has saved data (S201,YES), processor 100 transfers the saved data via overflow control unit 1030(, 2030 or 3030) to FIFO buffer unit 1010. Then, processor 100 updates the value of write-in address pointer wp (wp1 or wp2) in FIFO buffer unit 1010, according to the transferred data length (S202).

The above processes cause FIFO buffer unit 1010 to store incomplete packet data in a process of being written in before process A is suspended, following a packet written by process B. This enables remaining packet data to be written in, following the already stored packet data, and a complete packet to be written in FIFO buffer unit 1010, after resuming process A.

Figure 22:
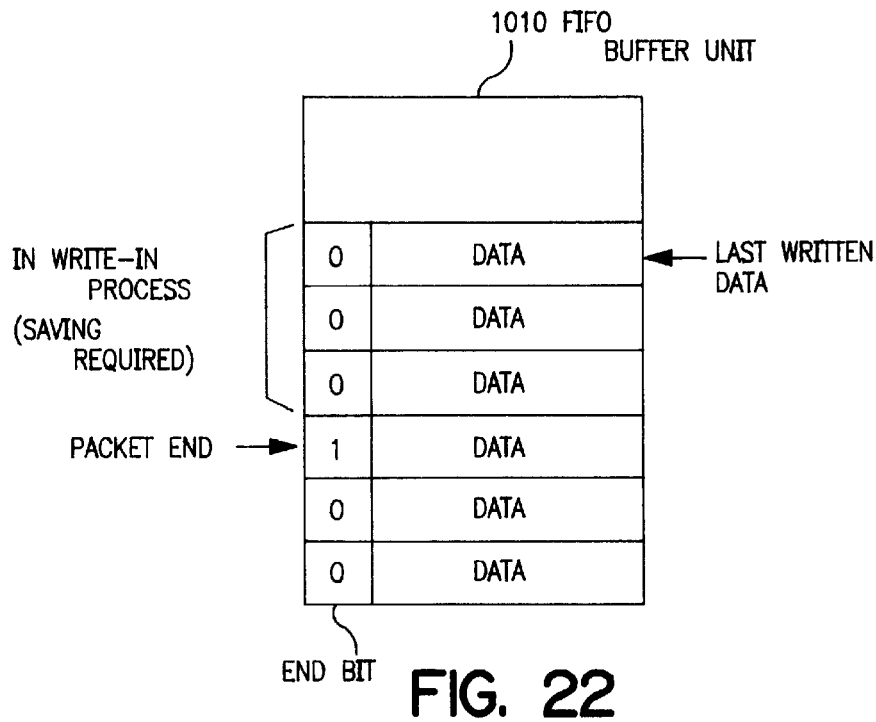
FIG. 22 is a table, illustrating the format of a packet stored in FIFO buffer unit 1010, shown in FIG. 8 and FIG. 13, or FIFO buffer unit 3010, shown in FIG. 16, when as with FIFO buffer unit 110A, shown in FIG. 7, it attaches to each packet it stores, one [1] bit datum (end bit) indicating the last bit of a packet.

FIG. 22 is a table, illustrating the format of a packet stored in FIFO buffer unit 1010, shown in FIG. 8 and FIG. 13, or FIFO buffer unit 3010, shown in FIG. 16, when, as with FIFO buffer unit 110A, shown in FIG. 7, it attaches to each packet it stores, one [1] bit datum (end bit), indicating the last bit of a packet.

Processor 100 determines whether or not FIFO buffer unit 1010 has incomplete packet data being written in during an execution of process A (in step S103 shown in FIG. 20) by any of the following methods 1., 2., and 3.

1. When each packet data set stored in FIFO buffer unit 1010 has an end bit, as shown in FIG. 14, processor 100 checks the value of the end bit attached to packet data last written into FIFO buffer unit 1010. Then, when the end bit is zero [0] (indicating other than the last data of a packet), processor 100 determines that FIFO buffer unit 1010 has incomplete data being written in during an execution of process A. In this case, as shown in FIG. 22, processor 100 saves, in saving buffer 1020 on memory 300, all packet data, from the packet data last written to the packet data stored immediately before the last data of the preceding packet, when the end bit is one [1] (indicating the last data of a packet).

2. Bus interface 400 is provided with a counter for counting the number of packet data sets to be written into FIFO buffer unit 1010. The counter starts its counting, upon each start of an operation of writing a packet into FIFO buffer unit 1010. The counter ends its counting by being reset to zero [0], upon ending an operation of writing into FIFO buffer unit 1010 the last data of a packet. Hence, upon switching (changing) from process A to process B, processor 100 can determine whether or not data are packet data being written in during an execution of process A by checking the counter value. That is, the counter value being zero [0] indicates a complete packet having been written in. On the other hand, the counter value not being zero [0] indicates the number of packet data sets in a process of being written in during an execution of process A. Hence, processor 100 saves, into saving buffer 1020 on memory 300, from the tail end data (data last written) in FIFO buffer unit 1010, as many packet data sets as the counter value.

Figure 23:
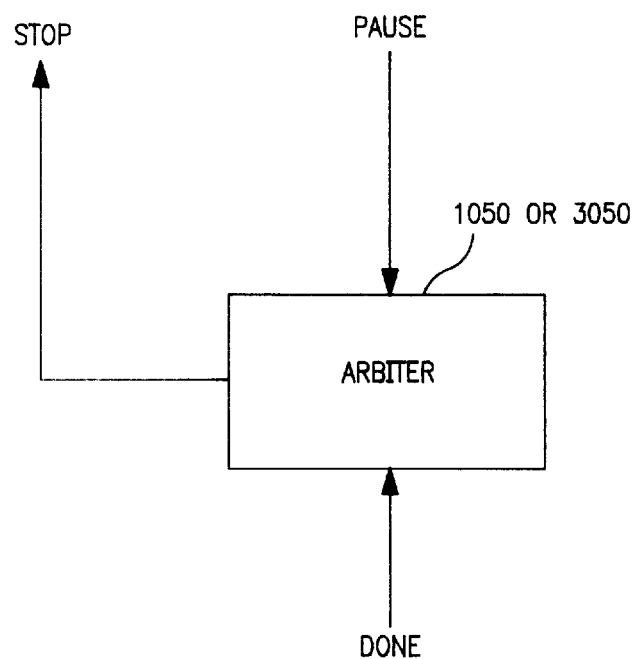
FIG. 23 is a sketch, illustrating a concept in which arbiter 1050, shown in FIG. 8, or arbiter 3050, shown in FIG. 16, receives an input signal "pause" and supplies an output signal "stop".

FIG. 23 is a sketch, illustrating a concept in which arbiter 1050, shown in FIG. 8, or arbiter 3050, shown in FIG. 16, receives an input signal "pause" and supplies an output signal "stop".

3. As shown in FIG. 23, arbiter 1050, shown in FIG. 8, or arbiter 3050, shown in FIG. 16, receives an input signal "pause" and supplies an output signal "stop", in addition to receiving an input signal "done". Input signal "pause" instructs a "suspension" to arbiter 1050 or arbiter 3050, and output signal "stop" indicates a status (suspension status) in which arbiter 1050 or arbiter 3050 has FIFO buffer unit 1010 suspend its data output.

Figure 24C:
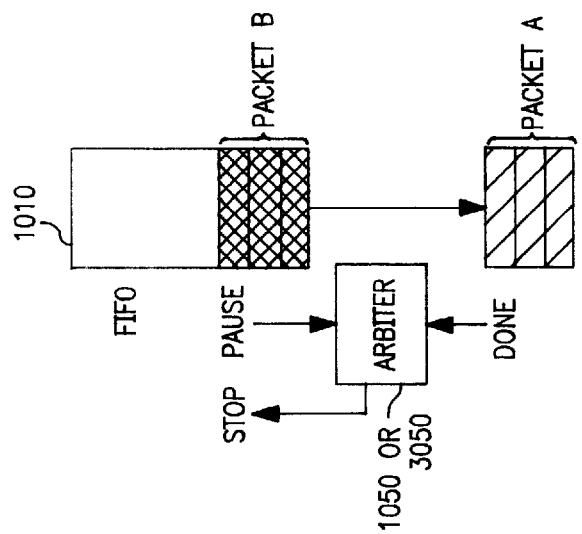
FIGS. 24A, 24B and 24C are sketches, illustrating, in a three-part series, an operation of arbiter 1050 (shown in FIG. 8) or arbiter 3050 (shown in FIG. 16), based on a configuration shown in FIG. 23.
Figure 24B:
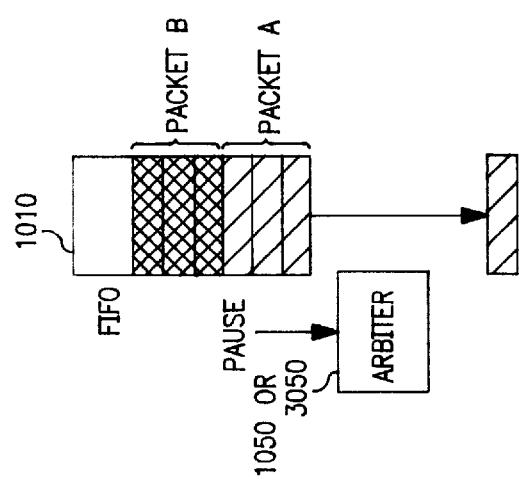
Figure 24A:
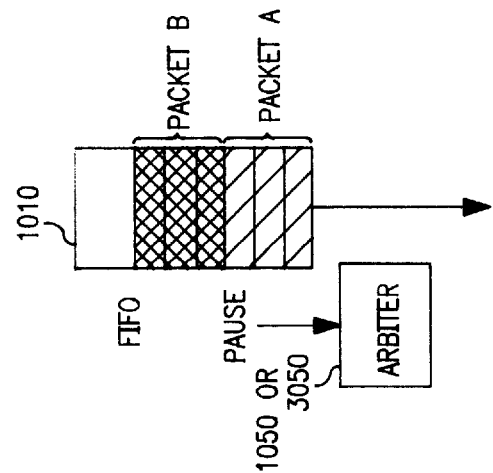

FIGS. 24A, 24B and 24C are sketches, illustrating, in a three-part series, an operation of arbiter 1050 (shown in FIG. 8) or arbiter 3050 (shown in FIG. 16), based on a configuration shown in FIG. 23.

When input signal "pause" specifies a suspension (FIG. 24A), arbiter 1050 or 3050 has FIFO buffer unit 1010 output packet data (FIG. 24B and FIG. 24C), until FIFO buffer unit 1010 outputs all of data being outputted from packet A, i.e. until packet processing device 500 outputs input signal "done", which is being set to "active". After packet data in packet A are outputted to the end, arbiter 1050 or 3050 has FIFO buffer unit 1010 suspend outputting data, and sets to "active" output signal "stop" for indicating the "suspension status". Hence, when output signal "stop" is set to "active", head end data stored in FIFO buffer unit 1010 necessarily become head end data of a packet.

Upon switching its execution right from process A to process B, processor 100 supplies input signal "pause", which is set to "active", via bus interface 400 to arbiter 1050 or 3050. Then, upon detecting via bus interface 400, that output signal "stop" changes to "active", an analysis of the content of FIFO buffer unit 1010, through a sequential readout of data from the head end data stored in FIFO buffer unit 1010, enables processor 100 to detect whether or not FIFO buffer unit 1010 has an incomplete packet i.e. an incomplete packet being written in during an execution of process A.

A queue control apparatus of a first form of this invention, shown in FIG. 1, has the following advantages:

A data generating device for writing data into a FIFO buffer can continually output data without having to stand by for the FIFO buffer to have an available space, even when the FIFO buffer has no available space, which improves processing efficiency.

Moreover, in this case, a use, as a FIFO buffer, of a memory device having a high access speed and a comparatively small capacity, and a use, as a saving buffer, of a memory device having a larger capacity but a lower access speed than the FIFO buffer, realize a queue control apparatus having a high performance at a low cost.

In addition, detection that a remaining capacity of the FIFO buffer is sufficient enables hardware or software processing to restore, in the FIFO buffer, data saved in the saving buffer, in a proper sequence and in a proper format. After the saving buffer saves no data at all, it becomes possible to write data into the FIFO buffer, again, as long as the FIFO buffer has an available space. When hardware realizes the restoration process, because a processor has no interrupt, a high system performance is obtained without any hindrance to a processing of the processor. On the other hand, a software processing for a restoration process realized by a processor eliminates a requirement for complex hardware, thus enabling a packaged area to be reduced.

Accordingly, this enables a processing such as expanding the size of the saving buffer e.g. by interrupting an operation of a processor.

A queue control apparatus of a second form of this invention, shown in FIG. 2, has the following advantages:

A reference to the counter value of a counter unit enables a packet processing device to continually take out packet data after a packet becomes complete in a FIFO buffer, thereby realizing efficient packet processing. More specifically, a packet processing device for processing packets taken out from a plurality of FIFO buffers can start processing a complete packet by taking it out from the FIFO buffer, which improves packet processing efficiency.

It can also realize a function of processing with priority packets taken out from a FIFO buffer storing the largest number of packets.

A data generating device for writing data into a FIFO buffer can continually output data without having to stand by for the FIFO buffer to have an available space, even when the FIFO buffer has no available space, which improves packet processing efficiency.

As such, the FIFO buffer can restore packets saved in the saving buffer, including a packet whose data are partially saved, in a proper sequence and in a proper format.

A reference to the counter value of a counter unit prevents the FIFO buffer from outputting incomplete packet data. In addition, since it is possible to know whether or not the FIFO buffer has a complete packet, the packet processing device, by starting to take out a packet after the packet becomes complete in the FIFO buffer, eliminates unnecessary idle time standing by for the FIFO buffer to have all data of a packet, which improves packet processing efficiently.

A data generating device for writing data into a FIFO buffer can continually output data without having to stand by for the FIFO buffer to have an available space, even when the FIFO buffer has no available space, which improves packet processing efficiency.

A reference of a particular bit, together with packet data, outputted from the FIFO buffer, enables a packet processing device to easily detect whether or not data read out from the FIFO buffer are the last data of the packet. This facilitates for the counter unit to generate a decrement signal.

A queue control apparatus of a third form of this invention, shown in FIG. 3, has the following advantages:

A counter unit calculates the number of packet data sets stored in FIFO buffer. A packet-end detection unit detects whether or not FIFO buffer has a complete packet by receiving as its input, for a comparison with the number of packet data sets, data having the counter value and the size of a packet stored at the head end of the FIFO buffer.

Consequently, one use of data detected by packed-end detection unit prevents incomplete packet data in the FIFO buffer from being outputted to a packet processing device.

This invention allows a packet generating device to output a generated packet, even when a FIFO buffer has no available space, which improves packet processing efficiency.

As such, the FIFO buffer can restore packets saved in the saving buffer, including a packet whose data are partially saved, in a proper sequence and in a proper format, anytime when the FIFO buffer has an available space. Also, this eliminates the requirement for a packet processing device for processing a packet taken out from the FIFO buffer, to stand by until packet data saved from the saving buffer are transferred to the FIFO buffer. This reduces unnecessary waiting time.

A queue control apparatus of a fourth form of this invention, shown in FIG. 4, has the following advantages:

Even if packet data are in the process of being written into a FIFO buffer during an execution of process A, packet data can be written into the FIFO buffer during an execution of newly-invoked process B. When process B is reinvoked, remaining packet data can be written into the FIFO buffer during an execution of process B. This enables incomplete packet data already stored in FIFO buffer to be saved and restored.

Although this invention has been described in its preferred forms with a certain degree of particularity, it is understood that the present disclosure of the preferred forms have been changed in details of construction and that the combination and arrangement of parts may be restored without departing from the spirit and the scope of this invention, as hereinafter claimed.

What is claimed is:

1. A queue control apparatus for exchanging data from a data generating device for generating data, a data processing device which executes a predetermined process on the generated data, the queue control apparatus comprising:

data storage means for sequentially storing data generated by the data generating device and for outputting the stored data sequentially, based on an input sequence, to the data processing device;

first detection means for detecting that a remaining storage capacity of said data storage means, detected based on signals from the data generating device and the data processing device, is less than a predetermined first threshold;

saved data memory means for saving data; and data saving means for saving, in said saved data memory means, data outputted from said data generating device to said data storage means, after said first detection means detects that the remaining storage capacity of said data storage means is less than the predetermined threshold.

2. The queue control apparatus according to claim 1, further comprising:

a flag means for indicating that the data is being stored in said saved data memory means; and wherein:

said data saving means sets said flag means, upon storing data in said saved data memory means, and continues to save the data into said saved data memory means data while said flag is set.

3. The queue control apparatus according to claims 2, further comprising:
- a second detection means for detecting the remaining storage capacity of said data storage means is greater than a predetermined second threshold; and
- a data restoration means for transferring data saved in said saved data memory means to said data storage means when said second detection means detects that the remaining storage capacity of said data storage means is greater than said second threshold;
  - wherein said data restoration means resets said flag means when said saved data memory means no longer stores any data.

4. The queue control apparatus according to claim 1, wherein:
said data storage means is a FIFO buffer.

5. The queue control apparatus according to claim 1, further comprising:
- second detection means for detecting that the remaining storage capacity of said data storage means is greater than a predetermined second threshold; and
- data restoration means for transferring to said data storage means data saved in said saved data memory means when said second detection means detects that the remaining storage capacity of said data storage means is greater than the second threshold.

6. The queue control apparatus according to claim 1, further comprising:
- second detection means for detecting and outputting a detection signal when the remaining storage capacity of said saved data memory means is less than a predetermined second threshold.

7. The queue control apparatus according to claim 6, further comprising:
- control means for expanding a storage capacity of said saved data memory means, upon an input of the detection signal from said second detection means.

8. A queue control apparatus for exchanging data from a packet generating device for generating a packet to a packet processing device which executes a predetermined process on the packet, the queue control apparatus comprising:
- packet storage means for sequentially storing a packet generated by the packet generating device and for outputting the stored packet sequentially to the packet processing device according to an input sequence; and
- packet number counter means for counting the number of packets stored in said packet storage means wherein the count is incremented by said packet generating device when the packet generating device generates a packet and the count is decremented by said packet processing device when the packet processing device receives a packet.

9. The queue control apparatus according to claim 8, wherein:
data of a packet stored in said packet storage means has tail end data indicating whether the data is the last data of the packet.

10. The queue control apparatus according to claim 9, further comprising:
- detection means for detecting that said packet storage means has outputted the last data of a packet; and wherein:
  - said packet number counter means decrements said counter value upon each detection, by said detection means, of an output of the last data of a packet from said packet storage means.

11. The queue control apparatus according to claim 8, wherein:
said data storage means is a FIFO buffer.

12. The queue control apparatus according to claim 8, further comprising:
- first detection means for detecting that a remaining storage capacity of said packet storage means is less than a predetermined first threshold;
- saved packet memory means for saving packets outputted from said packet generating device; and
- packet saving means for saving in said saved packet memory means packets outputted from said packet generating device after said detection by said first detection means.

13. The queue control apparatus according to claim 12, further comprising:
- flag means for indicating that packets are being saved in said saved packet memory means; and wherein:
  - said packet saving means sets said flag means upon starting to store packets in said saved packet memory means, and continues to save the packets in said saved packet memory means while said flag means is set.

14. The queue control apparatus according to claim 13, further comprising:
- second detection means for detecting that the number of packets counted by said packet number counter means is less than a predetermined threshold; and
- data restoration means for transferring packets saved packet memory means to said packet storage means when said second detection means detects that the number of packets stored in said packet storage means is less than said second threshold;
  - wherein said data restoration means resets said flag means when said saved packet memory means no longer stores any packets.

15. The queue control apparatus according to claim 12, further comprising:
- second detection means for detecting that the number of packets detected by said packet number counter means is less than a predetermined second threshold; and
- data restoration means for transferring packets saved in said saved packet memory means to said packet storage means when said second detection means detects that the number of packets stored in said packet storage means is less than the second threshold.

16. The queue control apparatus according to claim 12, further comprising:
- second detection means for detecting and outputting a detection signal when the remaining storage capacity of said saved pocket memory means is less than a predetermined second threshold.

17. The queue control apparatus according to claim 16, further comprising:
- a control means for expanding a storage capacity of said saved data memory means, when said second detection means outputs a detection signal.

18. A queue control apparatus for exchanging data from a data generating device for generating data to a data processing device for executing a predetermined process on the data, the queue control apparatus comprising:
- packet storage means for storing a packet including data on a packet size;
- counter means for counting a number of data sets in a packet stored in said packet storage means; and packet-end detection means for detecting whether said packet storage means has a complete packet, by inputting data indicating the number of data sets in a packet, as counted by said counter means, and the size of a packet, as stored in said packet storage means.

19. The queue control apparatus according to claim 18, wherein:

said data storage means is a FIFO buffer.

20. The queue control apparatus according to claim 18, further comprising:

saved packet memory means said for saving data of a packet written into said packet storage means;

first detection means for detecting that a remaining storage capacity of said packet storage means is less than a predetermined first threshold; and packet data saving means for saving in said saved packet memory means packet data, supposed to be written into said packet storage means, after said first detection means detects that the remaining storage capacity of said packet storage means is less than said first threshold.

21. The queue control apparatus according to claim 20, further comprising:

flag means for indicating whether said saved packet memory means stores a packet and wherein said packet saving means sets said flag means upon starting to store data in said saved packet memory means.

22. The queue control apparatus according to claim 21, further comprising:

second detection means for detecting that the counter value of said counter means is less than a predetermined second threshold; and data restoration means for transferring data of a packet saved in said saved packet memory means to said packet storage means when said second detection means detects that a remaining storage capacity of said packet storage means is less than the second threshold; and wherein said data restoration means resets said flag means when said saved packet memory means no longer stores any packet.

23. The queue control apparatus according to claim 20, further comprising:

second detection means for detecting that the counter value of said counter means is less than a predetermined second threshold; and data restoration means for transferring data of a packet saved in said saved packet memory means to said packet storage means when said second detection means detects that a remaining storage capacity of packet storage means is less than the second threshold.

24. The queue control apparatus according to claim 23, further comprising:

flag means for indicating whether said saved packet memory means stores a packet; and wherein said data restoration means resets said flag means, when said saved packet memory means stores no longer stores any packet.

25. The queue control apparatus according to claim 20, further comprising:

second detection means for detecting and outputting a detecting signal when the remaining storage capacity of said saved packet memory means is less than a predetermined third threshold.

26. The queue control apparatus according to claim 25, further comprising:

controlling means for expanding a storage capacity of said saved data memory means when said second detection means inputs said detection signal.

27. A queue control apparatus for exchanging packets from a packet generating device for generating the packets to a packet processing device for executing a predetermined process on an inputted packet, the queue control apparatus comprising:

packet storage means for storing and outputting, on a FIFO basis, packets generated by the packet generating device and representing a plurality of processes;

saved packet memory means for saving data of a packet written into said packet storage means;

packet data saving means for, when a first process with an execution right is writing a first packet to said packet storage apparatus and the execution right is switched to a second process which attempts to write second packet to said packet storage means causing the first packet to be an incomplete packet, taking out from said packet storage means the incomplete packet data written by the first process and saving the incomplete packet data in said saved packet memory means;

data restoration means for transferring to said packet storage means packet data saved in said saved packet memory means before said first process causes a packet to be written into said packet storage means, when the execution right is switched back to said first process.

28. A method for supplying data to a queue control apparatus which exchanges data from a data generating device for generating data to a data processing device for executing a predetermined process on the data generated by the data generating device, the method comprising the steps of:

sequentially storing in a data storage data outputted from the data generating device;

detecting whether a remaining storage capacity of the data storage is less than a predetermined first threshold;

after detecting that the remaining storage is less than the predetermined threshold, saving in a saved data memory data supposed to be stored in said data storage.

29. The method for supplying data to a queue control apparatus according to claim 28, further comprising the steps of:

detecting whether the remaining storage capacity of the data storage is greater than a predetermined second threshold; and sequentially transferring data saved in the saved data memory to the data storage upon detecting that the remaining storage capacity of the data storage is greater than the second threshold.

* * * * *